United States Patent
Ramesh

(10) Patent No.: US 11,240,205 B1
(45) Date of Patent: Feb. 1, 2022

(54) IMPLEMENTING RULES IN FIREWALLS

(71) Applicant: Amazon Technologies, Inc., Seattle, WA (US)

(72) Inventor: Umesh Kumar Ramesh, Sammamish, WA (US)

(73) Assignee: Amazon Technologies, Inc., Seattle, WA (US)

( * ) Notice: Subject to any disclaimer, the term of this patent is extended or adjusted under 35 U.S.C. 154(b) by 344 days.

(21) Appl. No.: 16/404,407

(22) Filed: May 6, 2019

(51) Int. Cl.
*H04L 29/06* (2006.01)

(52) U.S. Cl.
CPC ...... *H04L 63/0263* (2013.01); *H04L 63/0236* (2013.01); *H04L 63/101* (2013.01); *H04L 63/20* (2013.01)

(58) Field of Classification Search
CPC ............. H04L 63/0236; H04L 63/0263; H04L 63/101
USPC .......................................................... 726/1
See application file for complete search history.

(56) References Cited

U.S. PATENT DOCUMENTS

2006/0282887 A1* 12/2006 Trumper ................ H04L 63/20 726/11

* cited by examiner

Primary Examiner — Anthony D Brown
(74) Attorney, Agent, or Firm — Lee & Hayes, P.C.

(57) ABSTRACT

This disclosure describes systems, devices, and techniques for implementing master rules in firewalls. In some cases, at least one master rule is identified. The at least one master rule can be associated with performing at least one first operation on a first type of data traffic that satisfies at least one first condition. Multiple firewalls may implement the at least one master rule. In addition, a first firewall among the multiple firewalls may implement at least one application-specific rule in addition to the at least one master rule. The at least one application-specific rule may be associated with performing at least one second operation on a second type of data traffic that satisfies at least one second condition. The multiple firewalls may be between multiple applications and at least one network. Specifically, the first firewall may be deployed between a first application among the multiple applications and the network(s).

20 Claims, 13 Drawing Sheets

IMPLEMENTING RULES IN FIREWALLS

BACKGROUND

When web applications are developed by an organization, the organization may be divided into multiple teams. In some cases, a "development team" develops the applications by adding new software, modifying existing software, and/or deleting existing software. In certain examples, an "operations team" can modify code that defines access and permissions to the applications. For example, the operations team may include or be associated with a "security team" that can enable, modify, or eliminate security features that protect the applications developed by the development team.

In traditional software development models, development and operations teams are siloed. For example, a development team can be capable of modifying a first section of software (e.g., application software) and an operations team can be capable of modifying a second portion of the software (e.g., security software protecting the applications), but the development team may be incapable of modifying the second portion and the operations team may be incapable of modifying the first portion. The separation of development and operations teams can slow down the development and deployment of software updates. For instance, siloed development and operations teams may have to coordinate with each other before an update can be issued. As software updates increase in importance, delays associated with siloed development and operations teams can leave applications vulnerable to malicious data traffic.

In addition, a security team is traditionally required to independently enforce security policies for individual applications, even when those applications are vulnerable to the same type of security risks. Accordingly, delays may occur between identifying a global security risk and updating at least some of the security policies, thereby leaving some of the individual applications at least temporarily vulnerable. Furthermore, independently updating various security policies can be time-consuming for security teams.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Figure 1:
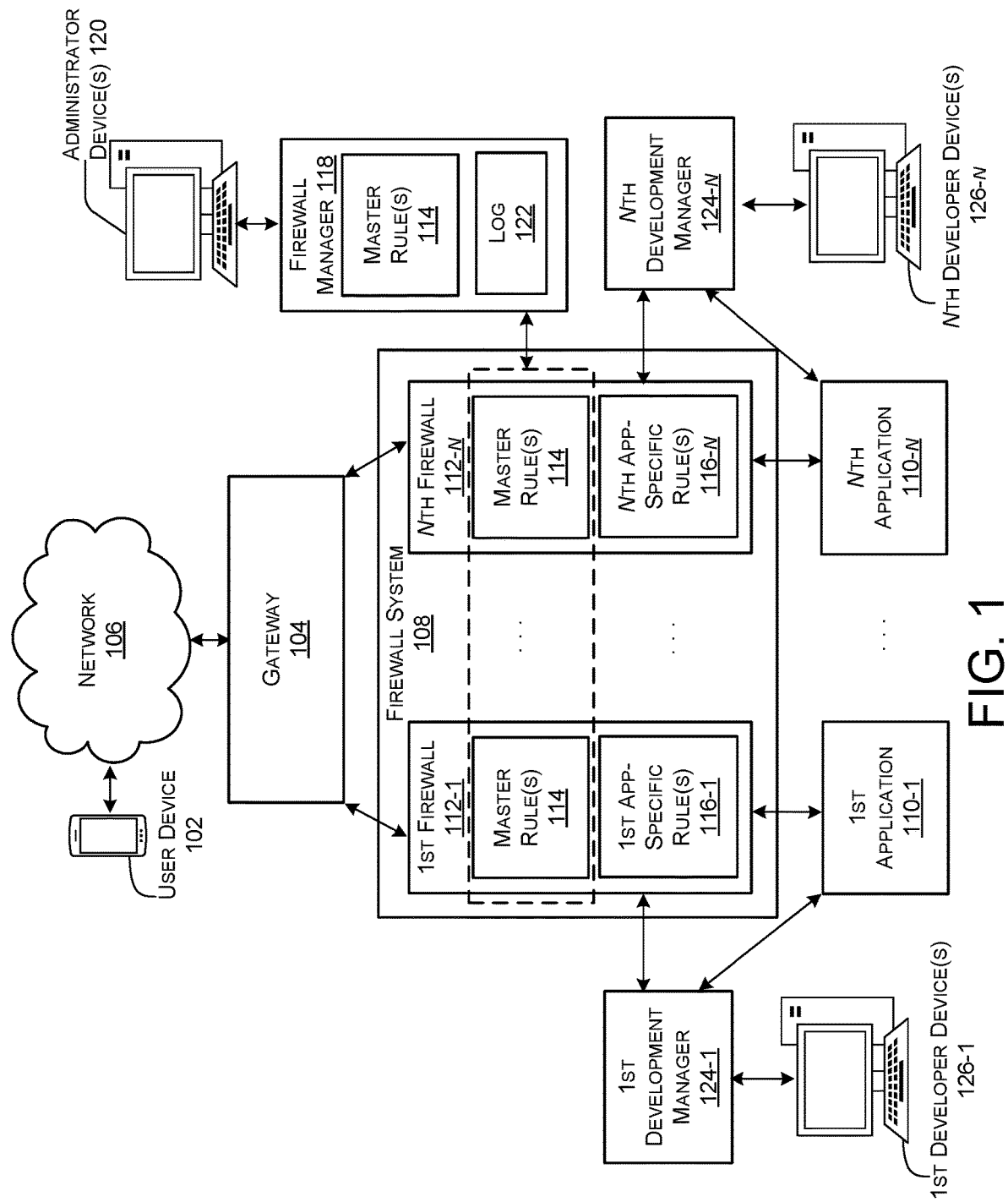
FIG. 1 shows an example environment for implementing master rules across multiple firewalls and implementing application-specific rules with respect to individual ones of the multiple firewalls.

This disclosure describes systems, devices, and techniques for implementing one or more master rules across multiple firewalls. In some cases, individual firewalls protecting individual applications can be further configured to implement one or more application-specific rules.

Various implementations can be applied to a "DevOps" model of software development. The DevOps model is an alternative to models that separate development and operations teams. In the DevOps model, development and operations teams may have overlapping control over the development, modification, and/or deployment of software. In some cases, the development and operations teams are coextensive. The DevOps model enables greater flexibility and control over the development and deployment of software updates, thereby enabling updates to be provided to consumers at a faster pace.

Various implementations of the present disclosure can be used to address specific problems associated with the DevOps model. Although the DevOps model enables faster updates due to its flexibility, such flexibility has drawbacks. In some cases, a developer in a development team may inadvertently modify or delete an important security rule at a firewall associated with an application under development. The developer may thereby cause unexpected security vulnerabilities in the application. Furthermore, in certain cases, the developer may add and deploy a new application before a corresponding administrator in an operations team can protect the new application with a firewall.

Master rules can be utilized to prevent such unexpected security vulnerabilities. In some examples, a central security administrator can specify a master rule that should be applied at one or more firewalls associated with one or more applications. The master rule represents a baseline security policy for the application(s). Even though developers may be capable of altering the firewall(s) and the application(s), the master rule may be automatically replaced in the firewall(s) if the developers modify or delete the master rule in the firewall(s). Accordingly, even in a DevOps model, a security policy floor can be implemented.

In some cases, several firewalls can implement the master rule. Accordingly, an administrator controlling multiple applications with multiple corresponding firewalls can easily and efficiently implement the master rule across all of the firewalls. In some cases, when a new application is added, a new firewall implementing the master rule can be automatically generated to protect the new application.

Further, in particular implementations, application-specific security rules can be implemented at the firewalls. For instance, if a developer determines that a first application is susceptible to a particular security vulnerability, but a second application is not, the developer can add an application-specific rule to a firewall associated with the first application that addresses the vulnerability without implementing the application-specific rule with respect to a firewall associated with the second application. Unlike a master rule, in various examples, an application-specific rule can be implemented at an individual firewall without being automatically implemented by other firewalls.

In some implementations, one or more firewalls implementing a master rule can be used to log, analyze, and identify suspicious requests to various applications. In some cases, a system can generate entries that indicate incoming requests received by a firewall and can cause the entries to be stored in a log. The entries can be analyzed to determine one or more new master rules, which can then be automatically implemented at the firewall, and potentially other related firewalls managed by the same organization.

Various implementations of the present disclosure have practical applications to real-world computer networks. Implementations may be performed by devices and/or systems that can exchange data packets with external entities via communication interfaces. Certain implementations can be applied to a distributed computing environment, such as a cloud computing environment. Various implementations described herein cannot be performed as a mental process. For example, various implementations relate to implementing improved firewalls that can intercept data traffic between computer networks (e.g., the Internet) and applications, which cannot be performed independently within the human mind.

Various implementations of the present disclosure provide improvements to the technological field of computer networks. Master rules can improve network security by ensuring that a baseline security policy protects one or more applications, even if individual developers delete or modify the firewalls protecting the application(s). Master rules can also improve network security by efficiently implementing at least one common security policy over multiple firewalls that protect multiple applications.

The combination of master rules and application-specific rules can enable customizable network policies that can be flexibly applied to various firewalls. One or more master rules can be used to enforce a baseline security policy that can protect all applications managed by the same organization. In addition, one or more application-specific rules can enable selectively heightened security policies at some applications that may require a higher level of security than the baseline. When an application-specific rule is stored at a first firewall corresponding to a first application, but is not stored at a second firewall corresponding to a second application, memory at the second application can be conserved without sacrificing a heightened security policy protecting the first application.

Furthermore, various implementations disclosed herein can improve network security by automatically analyzing incoming requests for suspicious behavior and implementing new master rules that address any behavior determined to be suspicious. Unlike implementations in which administrators have to individually determine, select, and activate rules for individual firewalls, implementations of the present application can be performed automatically. Accordingly, applications can be protected from relatively new security threats regardless of whether the administrators are actively monitoring third-party activity.

Various implementations of the present disclosure are described below with reference to the drawings. However, the disclosure is not limited to any of the drawings discussed herein.

FIG. 1 shows an example environment 100 for implementing master rules across multiple firewalls. In particular implementations, the environment 100 corresponds to a cloud computing environment.

In general, the environment 100 can include a user device 102 that interfaces with a gateway 104 over a network 106. As used herein, the terms "user equipment (UE)," "user device," "wireless communication device," "wireless device," "communication device," "mobile device," and "client device," can be used interchangeably to describe any device (e.g., the user device 102) that is capable of transmitting/receiving data over a communication interface. In some cases, the communication interface is a wired interface. In certain examples, the communication interface can correspond to a wireless interface, such that the device can transmit and/or receive data wirelessly using any suitable wireless communications/data technology, protocol, or standard, such as Global System for Mobile communications (GSM), Time Division Multiple Access (TDMA), Universal Mobile Telecommunications System (UMTS), Evolution-Data Optimized (EVDO), Long Term Evolution (LTE), Advanced LTE (LTE+), New Radio (NR), Generic Access Network (GAN), Unlicensed Mobile Access (UMA), Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), High Speed Packet Access (HSPA), evolved HSPA (HSPA+), Voice over IP (VoIP), VoLTE, Institute of Electrical and Electronics Engineers' (IEEE) 802.1x protocols, WiMAX, Wi-Fi, Data Over Cable Service Interface Specification (DOCSIS), digital subscriber line (DSL), CBRS, and/or any future Internet Protocol (IP)-based network technology or evolution of an existing IP-based network technology.

The network 106 can include at least one of a cloud-based network, a Local Area Network (LAN), or a Wide Area Network (WAN). In some cases, the network 106 can include a cloud-based network and a WAN, wherein the cloud-based network is connected between the WAN and the gateway 104. As used herein, the terms "cloud-based network," "cloud area network," "virtual cloud network," and their equivalents, may refer to an Internet Area Network (IAN). A cloud-based network may, in some cases, connect multiple nodes within a cloud environment. As used herein, the terms "wide area network," "WAN," "area network," and their equivalents, can refer to a network of multiple devices that are separated from each other by a geographic distance.

The geographic distance can be any geographic distance. In various examples, a WAN can include any of devices located in different rooms of a building, devices located in different buildings, devices located outside of buildings, devices located in different municipalities, devices located in different countries, or the like. A WAN can connect multiple external devices to each other via one or more communication interfaces, such that the external devices can exchange data (e.g., messages, requests, etc.) over the WAN. One example of a WAN is the Internet.

The gateway 104 may face the network 106, receive data packets from the network 106, and transmit data packets to the network 106. In some cases, data packets may be transmitted between the gateway 104 and the network 106 over at least one interface. The interface(s) can include any suitable communication interface, such as a wireless interface, a wired interface, or the like. In some implementations, the gateway 104 is an Application Programming Interface (API) gateway.

In particular implementations, the gateway 104 may correspond to a Content Delivery Network (CDN). For instance, the gateway 104 may be part of a CDN. In some examples, the gateway 104 may include the CDN. As used herein, the terms "content delivery network," "content distribution network," "CDN," and their equivalents can refer to a network of one or more "node" devices (e.g., servers) that can at least temporarily store (e.g., cache) content (e.g., any type of data, such as media content) from one or more "host" devices (e.g., servers). In some cases, a request for content from the host device(s) can be routed to the node device(s) and the node device(s) can provide the content rather than the host device(s). In some circumstances in which the node device(s) are located geographically closer to the destination of the content than the host device(s), the content may be delivered more quickly by the node device(s) than by the host device(s). In certain implementations in which the requested content is not stored at the node device(s), the request for the content can be forwarded to the host device(s), which can deliver the content. Referring back to FIG. 1, in some examples, the gateway 104 may include at least one node device in a CDN.

In certain implementations, the gateway 104 may correspond to a load balancer. For example, the gateway 104 may be part of a load balancer. In some cases, the gateway 104 may include a load balancer. As used herein, the term "load balancer" can refer to a system that can distribute workloads across multiple computing resources to, for example, maximize efficiency in the computing resources. In some cases, a load balancer can service requests for computing resources and selectively distribute the requests to the computing resources in a manner that prevents any of the computing resources from being overloaded, that decreases congestion in any network or communication interface connected to the computing resources, that decreases congestion in the computing resources, that increases an aggregate throughput of the computing resources, that decreases response times of the computing resources, and/or that otherwise optimizes usages of the computing resources. The load balancer and/or the computing resources may be connected to each other by one or more communication interfaces and/or networks.

In some cases, the gateway 104 may receive an incoming request from the network 106, determine a destination of the incoming request, and forward the incoming request to another entity based on the determined destination. The incoming request, in some cases, can include a data packet requesting data, content, computing resources, and/or performance of some functionality. That is, the incoming request may be part of data traffic between the network 106 and the gateway 104.

In some cases, the incoming request received from the network 106 specifies the destination. For instance, the gateway 104 can receive an incoming request from the network 106 that includes a header and a payload, and the destination of the incoming request may be indicated in the header. In some examples, the header may include an Internet Protocol (IP) address identifying the destination.

In some examples in which the gateway 104 corresponds to a CDN, the gateway 104 may determine that the incoming request from the network 106 is destined for a host device. In particular examples, the gateway 104 may determine that the destination of the incoming request is a host device in response to determining that the content being requested is not cached at the gateway 104.

In some instances, in which the gateway 104 corresponds to a load balancer, the gateway 104 may select at least one device among multiple devices capable of providing the computing resources. In some cases, the selected device(s) may have a lower processing load than at least one other device among the multiple devices. In particular implementations, the gateway 104 may define the selected device(s) as the destination for the incoming request.

In various implementations, the gateway 104 may forward the incoming request from the network 106 to a firewall system 108. The gateway 104 may forward the incoming request based, at least in part, on the destination that the gateway determines for the incoming request. In particular implementations, the gateway 104 may package at least some data contained in the incoming request from the network 106 into at least one data packet addressed to the destination and forward the data packet(s) to the firewall system 108. In some examples, the data packet(s) packaged by the gateway 104 can include a header indicating an IP address of the destination.

In various implementations, the destination determined by the gateway can include an application, such as one of the first to nth applications 110-1 to 110-n illustrated in FIG. 1, wherein n is a positive integer. As used herein, the terms "application," "app," or their equivalents, can refer to at least one of a server, device, computing resource, software instance, virtual machine, or the like. According to some examples, an application can include at least one host device in a CDN. In some instances, an application can include at least one computing resource in a distributed environment. In some cases, an application can include at least a portion of a distributed program. The application may correspond to a server-side portion of a client-server model application, in which one or more "client" devices can exchange messages with one or more "server" devices. In various implementations, the server device(s) can perform at least one service for the client device(s). In particular implementations, the server device(s) can provide content to the client device(s). In some cases, an application may be a web application.

Referring back to FIG. 1, according to some examples, at least one of the applications 110-1 to 110-n may include, or at least be part of, a CDN. For example, in some implementations in which the gateway 104 corresponds to a CDN, at least one of the applications 110-1 to 110-n may include a host device that stores content. In some cases, the firewall system 108 may include, or at least be part of, a CDN. For instance, the firewall system 108 may be incorporated into at least one node device and/or at least one host device of a CDN that may also include the gateway 104.

In certain implementations in which the gateway 104 corresponds to a load balancer, multiple applications among the applications 110-1 to 110-*n* may be capable of providing a requested computing resource. In some implementations, the firewall system 108 can be located between a load balancer (e.g., a load balancer including the gateway 104) and the applications 110-1 to 110-*n*. According to particular examples, the firewall system 108 can include, or at least be part of, a load balancer. For instance, the firewall system 108 and the gateway 104 may be implemented in the same load balancer.

In various implementations, the gateway 104 may forward incoming requests destined for an application, such as one of the applications 110-1 to 110-*n*, to a firewall, such as one of first through nth firewalls 112-1 to 112-*n*, that corresponds to the destined application. For instance, the gateway 104 may transmit an incoming request destined for the first application 110-1 to the first firewall 112-1.

As used herein, the term "firewall," or its equivalents, can refer to any hardware and/or software designed to examine network traffic using one or more rules, and to take one or more actions with respect to the network traffic based on the one or more rules. In some cases, a firewall can be used to block unauthorized access while permitting authorized communications (or authorized data) to or from at least one of a network, a device, or a system.

As used herein, the term "rule," or its equivalents, can refer at least one condition and at least one action to perform if the condition(s) are satisfied. An "action" can also be referred to as a "function" or an "operation," in some instances. The condition(s) may be in the form of a conditional statement (e.g., an "if" statement), a Boolean expression (e.g., "(A AND B) OR C") a decision tree (e.g., a binary tree), or the like. The action(s) may include, for example, blocking data traffic, intercepting data traffic for further analysis, quarantining data traffic, returning an error message, forwarding data traffic, generating a report based on data traffic, or the like. A firewall may be deemed to "include" a rule when the firewall is configured to implement the rule. In some cases, the firewall includes a rule when the firewall stores the rule.

As used herein, the term "policy," or its equivalents, can refer to a general security strategy. In some cases, a policy can include one or more rules. Thus, a security policy for an application can be implemented by one or more rules in a firewall corresponding to the application. For instance, a security policy for the first application 110-1 may be implemented by any rules stored in the first firewall 112-1.

In various implementations, the applications 112-1 to 112-*n* may correspond to an application group. As used herein, the term "application group," and its equivalents, can refer to multiple applications managed by the same organization. In some cases, one or more developers in a development team can modify any or all of the applications in the application group. In addition, in certain cases, the developers can develop and/or add new applications to the application group.

A firewall may "correspond" to an application when the firewall lies between the application and a network, such as the network 106. A firewall that "corresponds" to an application may intercept and/or protect the application from a type of network traffic according to at least one rule implemented by the application. With reference to FIG. 1, the first firewall 112-1 may correspond to the first application 110-1 and the nth firewall 112-*n* may correspond to the nth application 110-*n*. In some cases, a firewall corresponding to an application may protect that application from potentially malicious requests transmitted from external devices. Although FIG. 1 illustrates the first to nth firewalls 112-1 to 112-*n* in a one-to-one relationship with the first to nth applications 110-1 to 110-*n*, in some implementations, multiple firewalls can correspond to the same application and/or a single firewall can correspond to multiple applications.

In particular implementations, the first to nth firewalls 112-1 to 112-*n* may be part of a firewall group. As used herein, the term "firewall group," and its equivalents, can refer to multiple firewalls configured to protect an application group. In particular implementations, one or more operators in an operations team and/or one or more developers in a development team can modify all of the firewalls in the firewall group. In some cases, an administrator can cause all of the firewalls in the firewall group to implement one or more master rules.

As illustrated in FIG. 1, each of the firewalls 112-1 to 112-*n* includes at least one master rule 114. As used herein, the term "master rule," and its equivalents, can refer to a rule that is implemented by multiple firewalls in a firewall group. The master rule(s) 114 included in each of the firewalls 112-1 to 112-*n* may be substantially identical. For example, the master rule(s) 114 may cause first firewall 112-1 to act similarly to the nth firewall 112-*n* with respect to similar incoming requests. For instance, if the master rule(s) 114 specified that all incoming requests from a particular IP address should be blocked, the first firewall 112-1 would block an incoming request from the particular IP address and the nth firewall 112-*n* would block an incoming request from the particular IP address, thereby preventing the first and nth applications 110-1 and 110-*n* from receiving the incoming requests. Accordingly, the master rule(s) 114 can provide a baseline level of security to all of the applications 110-1 to 110-*n*. That is, the master rule(s) 114 can enable the firewall system 108 to implement a minimum security policy protecting all of the applications 110-1 to 110-*n*.

FIG. 1 further depicts that each of the firewalls 112-1 to 112-*n* may further include at least one application-specific rule 116-1 to 116-*n*. As used herein, the terms "application-specific rule," "app-specific rule," and their equivalents, can refer to a rule that is implemented by fewer than all firewalls in a firewall group. In some cases, an application-specific rule can be implemented by only one firewall in the firewall group. Referring back to FIG. 1, the application-specific rules 116-1 to 116-*n* can supplement the master rule(s) 114 in the firewalls 112-1 to 112-*n*. Although FIG. 1 illustrates that each one of the firewalls 112-1 to 112-*n* implements an application-specific rule, in some implementations, a particular firewall in the firewall group may implement the master rule(s) 114 without implementing any application-specific rules.

In some cases, the master rule(s) 114 are prioritized over the application-specific rules 116-1 to 116-*n* in the firewalls 112-1 to 112-*n*. For instance, when the first firewall 112-1 receives an incoming request destined for the first application 110-1, the first firewall 112-1 may apply the master rule(s) 114 to the incoming request, and may only apply first application-specific rule(s) 116-1 to the incoming request if the master rule(s) 114 do not cause the first firewall 112-1 to block the data from reaching the first application 110-1.

Any one of the application-specific rules 116-1 to 116-*n* may be customized to a corresponding one of the applications 110-1 to 110-*n*. For instance, each of the application-specific rules 116-1 to 116-*n* may be customized to the firewall among the firewalls 112-1 to 112-*n* in which the application-specific rule 116-1 to 116-*n* is included. In some examples, the first application specific rule(s) 116-1 in first firewall 112-1 may be specific to the first application 110-1, and the nth application specific rule(s) 116-$n$ in the nth firewall 112-$n$ may be specific to the nth application 110-$n$. In particular implementations, the first application specific rule(s) 116-1 may be omitted from the nth firewall 112-$n$, and the nth application-specific rule(s) 116-$n$ may be omitted from the first firewall 112-1. Unlike certain implementations of the master rule(s) 114, each of the firewalls' 112-1 to 112-$n$ corresponding application-specific rule(s) 116-1 to 116-$n$ may be different from each other.

As illustrated in FIG. 1, the environment 100 further includes a firewall manager 118. In some cases, the firewall manager 118 is at least partially coextensive with the firewall system 108. That is, the firewall manager 118 and the firewall system 108 may be incorporated in the same virtual machine, device, and/or system. The firewall manager 118 may be configured to establish the master rule(s) 114 and cause the firewalls 112-1 to 112-$n$ to include the master rule(s) 114. In particular implementations, the firewall manager 118 may automatically restore any modified master rule(s) 114 stored in the firewalls 112-1 to 112-$n$. According to certain implementations, in response to a new application in the application group of applications 110-1 to 110-$n$ being generated, the firewall manager 118 may automatically generate (or cause the generation of) a new firewall implementing the master rule(s) 114 in the firewall manager 108 to protect the new application.

According to particular implementations, the firewall manager 118 may receive, from at least one administrator device 120, at least one indication of the master rule(s) 114. The administrator device(s) 120 may include at least one user device. The administrator device(s) 120 may include at least one device associated with a designated security administrator account for managing security policies of the applications 110-1 to 110-$n$. In some cases, the administrator device(s) 120 include a device logged in to a website with a particular administrator account corresponding to the application group of the applications 110-1 to 110-$n$. A user can select the master rule(s) 114 though a user interface provided by the administrator device(s) 120. The indication(s) of the master rule(s) 114 received from the administrator device(s) 120 may indicate a modification to the master rule(s) 114. For example, the indication(s) may include any of an indication of a new master rule, an indication of a change to an existing master rule, an indication of a deletion of an existing master rule, or the like.

In particular implementations, the firewall manager 118 may be configured to receive entries corresponding to behavior of the first to nth firewalls 112-1 to 112-$n$ and store the entries in a log 122. The first to nth firewalls 112-1 to 112-$n$ and/or the firewall system 108 may generate entries based on incoming requests and actions taken by the first to nth firewalls 112-1 to 112-$n$ with respect to the incoming requests. In some cases, generating entries may be actions specified by any of the master rule(s) 114 and/or any of the application-specific rules 116-1 to 116-$n$ in response to incoming requests satisfying specified conditions. For example, when the master rule(s) 114 specify that an entry should be generated based on any incoming request from a particular IP address, the first firewall 112-1 may generate an entry corresponding to a request in response to receiving an incoming request from the particular IP address. In implementations in which the firewall system 108 is separate from the firewall manager 118, the first to nth firewalls 112-1 to 112-$n$ and/or the firewall system 108 may further transmit indications of the entries to the firewall manager 118.

In particular implementations, the firewall manager 118 may be configured to analyze the entries in the log 122 and derive at least one new rule to add to the master rule(s) 114 based on the analysis. In some cases, the firewall manager 118 may identify trends associated with suspicious behavior based on the log 122. The firewall manager 118 may automatically generate new rules to include in the master rule(s) 114 that address the identified trends. For example, if the firewall manager 118 determines that multiple suspicious requests (e.g., requests blocked according to an existing rule by the first firewall 112-1) are being addressed to the first application 110-1 from a particular IP address, the firewall manager 118 may automatically derive a new rule that involves blocking all requests from the particular IP address, and then add the new rule to the master rule(s) 114.

The firewall manager 118 may distribute an indication of the master rule(s) 114 to the firewalls 112-1 to 112-$n$ in the firewall system 108. The firewall manager 118, the firewall system 108, or a combination thereof, may automatically distribute the master rule(s) 114 to each one of the firewalls 112-1 to 112-$n$. Accordingly, any modification to the master rule(s) 114 (e.g., by the administrator device(s) 120 or the firewall manager 118 itself) can be automatically applied to all of the firewalls 112-1 to 112-$n$.

The environment 100 may further include first to nth development managers 124-1 to 124-$n$. In particular implementations, the first to nth development managers 124-1 to 124-$n$ may enable a development team the opportunity to modify the first to nth firewalls 112-1 to 112-$n$ and/or the first to nth applications 110-1 to 110-$n$. The first to nth development managers 124-1 to 124-$n$ may be configured to add, change, or delete functionality, software, modules, objects, and/or code in the first to nth firewalls and the first to nth applications upon receiving instructions from first to nth developer devices 126-1 to 126-$n$. Each of the development managers 124-1 to 124-$n$ may be associated with one or more of the developer devices 126-1 to 126-$n$. In some cases, individual developers can log on to developer accounts on the developer devices 126-1 to 126-$n$. The developers may be able to indicate modifications to the firewalls 112-1 to 112-$n$ and/or the applications 110-1 to 110-$n$ via user interfaces presented by the developer devices 126-1 to 126-$n$. Indications of any changes received by the developer devices 126-1 to 126-$n$ may be distributed by the development managers 124-1 to 124-$n$, which may be distributed to the first to nth firewalls 112-1 to 112-$n$ and the first to nth applications 110-1 to 110-$n$.

In some cases, at least one of the development managers 124-1 to 124-$n$ may be configured to add a new application to the application group including the applications 110-1 to 110-$n$. For example, one of the development managers 124-1 to 124-$n$ may be able to designate a new computing resource (e.g., at least a portion of memory in a distributed system) for the new application, may upload software to be executed by the new computing resource, and/or may upload content that can be stored by the new computing resource. In particular implementations, individual developers may be able to indicate the new application to one of the development managers 124-1 to 124-$n$. The new application may be indicated via at least one user interface presented on the developer devices 126-1 to 126-$n$ by the development managers 124-1 to 124-$n$. In response, one of the development managers 124-1 to 124-$n$ can deploy the new application. The new application may be connected to the gateway 104 in a similar manner to the first to nth applications 110-1 to 110-$n$.

Although FIG. 1 illustrates that each firewall/application pair (e.g., the first firewall 112-1 and the first application 110-1, or the nth firewall 112-*n* and the nth application 110-*n*) corresponds to a single one of the development managers 124-1 to 124-*n*, in various implementations, more than one of the firewalls 112-1 to 112-*n* can correspond to a single one of the development managers 124-1 to 124-*n*, more than one of the applications 110-1 to 110-*n* can correspond to a single one of the development managers 124-1 to 124-*n*, a single firewall can correspond to more than one of the development managers 124-1 to 124-*n*, a single one of the applications 110-1 to 110-*n* can correspond to more than one of the development managers 124-1 to 124-*n*, or a combination thereof.

The firewall manager 118 may be further configured to monitor the master rule(s) 114 stored in any of the firewalls 112-1 to 112-*n* and to restore any master rule(s) 114 that have been modified in any of the firewalls 112-1 to 112-*n*. In some examples, at least one of the development managers 124-1 to 124-*n* may modify (e.g., change, delete, add to, etc.) at least one of the master rule(s) 114 stored in the firewalls 112-1 to 112-*n*. In response to the modification, the firewall system 108 may transmit an indication of the modification to the firewall manager 118, in implementations in which the firewall system 108 and the firewall manager 118 are separate systems. The firewall manager 118 can automatically restore the modified master rule(s) 114 in the firewalls 112-1 to 112-*n*. In some cases, the firewall manager 118 can transmit an indication to restore the modified master rule(s) 114 to the firewall system 108.

In particular implementations, the firewall manager 118 may be configured to generate (or cause the generation of) a new firewall to protect a new application added to the application group of the applications 110-1 to 110-*n*. In some examples, at least one of the development managers 124-1 to 124-*n* may deploy a new application. In response to the new application, the firewall system 108 may transmit an indication of the new application to the firewall manager 118. The firewall manager 118 can automatically generate (or cause the firewall system 108 to generate) a new firewall to protect the new application, wherein the new firewall is in the firewall group of the firewalls 112-1 to 112-*n*. In some cases, the firewall manager 118 can transmit an indication to generate the new firewall to the firewall system 108. The new firewall, like the firewalls 112-1 to 112-*n*, may implement the master rule(s) 114 to protect the new application.

Although the network 106, the gateway 104, the firewall system 108, the firewall manager 118, the administrator device(s) 120, the development managers 124-1 to 124-*n*, and the developer devices 126-1 to 126-*n* are illustrated in FIG. 1 as separate systems, in some cases, one or more of the network 106, the gateway 104, the firewall system 108, the firewall manager 118, the administrator device(s) 120, the development managers 124-1 to 124-*n*, and the developer devices 126-1 to 126-*n* can be combined into the same system. In various implementations, the applications 110-1 to 110-*n* are hosted on one or more devices, systems, virtual machines, and/or software containers that are separated, by the firewall system 108, from devices, systems, virtual machines, and/or software containers hosting the gateway 104.

In certain implementations, all incoming requests from the network 106 addressed to the applications 110-1 to 110-*n* are intercepted at the firewall system 108. Accordingly, the applications 110-1 to 110-*n* are prevented from receiving any malicious requests (specified by the master rule(s) 114 and/or any of the application-specific rules 116-1 to 116-*n*) by the firewall system 108.

In particular implementations, the environment 100 corresponds a DevOps model of software development. For example, the developer devices 126-1 to 126-*n* can be utilized by a development team with permissions to modify the firewalls 112-1 to 112-*n* and/or the applications 110-1 to 110-*n*. Accordingly, the development team may be able to efficiently modify software in the firewalls 112-1 to 112-*n* and/or the applications 110-1 to 110-*n*. In addition, the administrator device(s) 120 can be utilized by an operations team (e.g., a security-operations team) capable of implementing security policies at the firewalls 112-1 to 112-*n*. To ensure that a baseline security policy protects all of the applications 110-1 to 110-*n*, even when the firewalls 112-1 to 112-*n* are modified by the development team, the master rule(s) 114 can be distributed and maintained by the firewall manager 118. In some cases, the master rule(s) 114 can be at least partially specified by the operations team.

Figure 2:
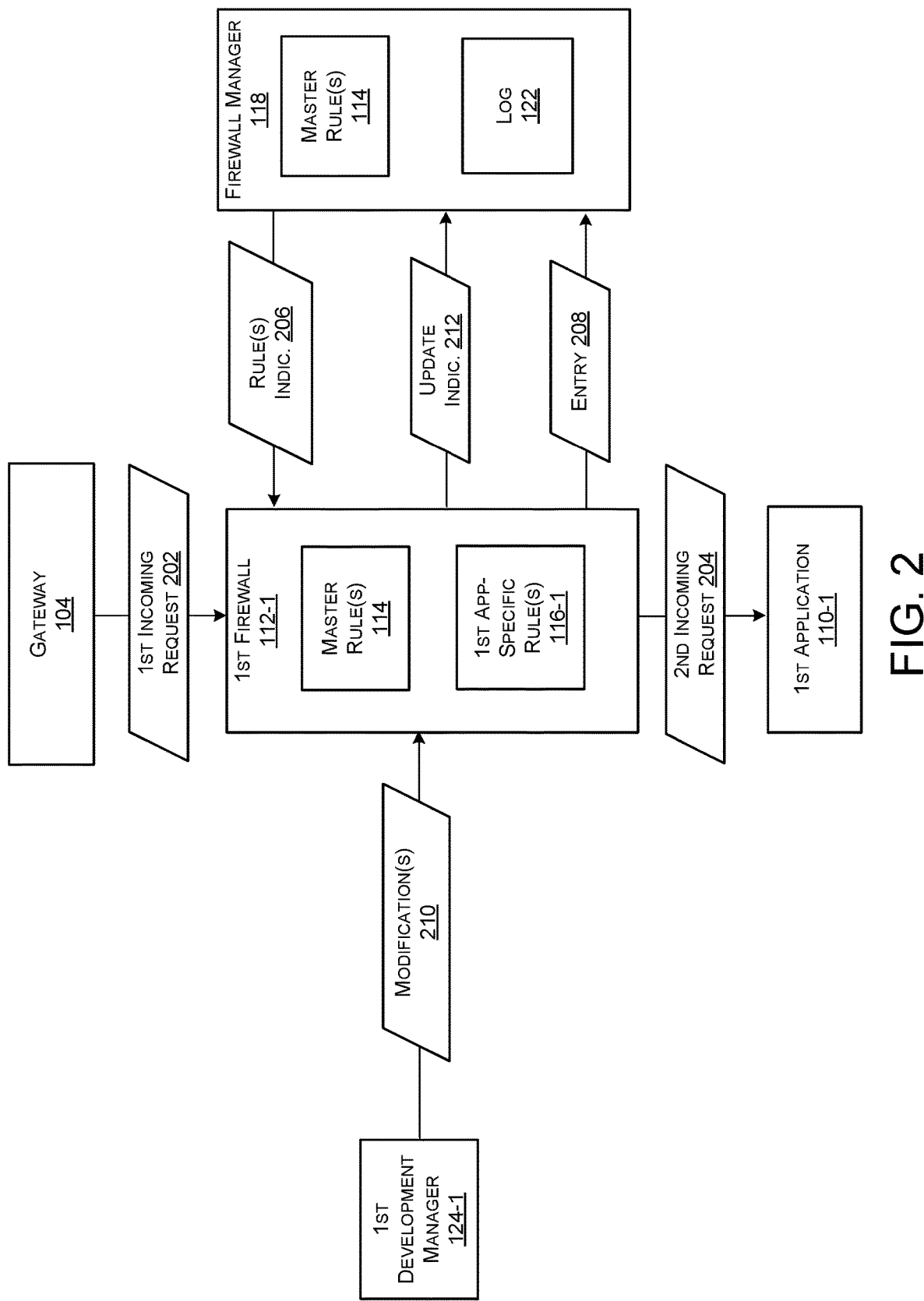
FIG. 2 illustrates example communications between elements of an environment, where the communications may correspond to data traffic being received and/or forwarded by a firewall implementing at least one master rule.

FIG. 2 illustrates example communications between elements of an environment 200. In various implementations, the environment 200 can include the gateway 104, the first application 110-1, the first firewall 112-1, the firewall manager 118, and the development manager 1 124-1, which are described above with reference to FIG. 1.

In various implementations, the gateway 104 may transmit a first incoming request 202 to the first firewall 112-1. As used herein, the term "incoming request," and its equivalents, can refer to at least one data packet requesting data and/or the performance of certain functionality. In some examples, the first incoming request 202 is received by the gateway 104 from an external device and is forwarded to the first firewall 112-1 by the gateway 104 without modifications. In certain examples, the gateway 104 determines a destination for the first incoming request 202 and adds an indication of the destination to the first incoming request 202.

In some implementations, the first incoming request 202 can include an IP address of a source of the first incoming request 202 and an Internet Protocol (IP) address of a destination of the first incoming request 202. In some cases, the destination includes or is associated with the first application 110-1.

In certain examples, the first incoming request 202 may indicate the first application 110-1 as its destination. In other words, the first incoming request 202 may be addressed to and/or destined for the first application 110-1. In some instances, the first incoming request 202 may include an Internet Protocol (IP) address corresponding to the first application 110-1. For example, the first incoming request 202 may include at least one data packet that includes a header specifying the IP address of the first application 110-1.

In particular examples, the first incoming request 202 can include a Hypertext Transfer Protocol (HTTP) request or an HTTP response. The HTTP request can include a request line and one or more header fields. The HTTP response can include a response line and one or more header fields. In some instances, multiple header fields in the first incoming request 202 can be colon-separated and in a clear-text string format. In some cases, an HTTP request or HTTP response can be terminated by a carriage return and line feed character sequence.

Upon receiving the first incoming request 202, the first firewall 112-1 may evaluate the first incoming request 202 in view of the master rule(s) 114. In some cases, the first firewall 112-1 may further evaluate the first incoming request 202 in view of the first application-specific rule(s) 116-1. The first firewall 112-1 may determine whether the first incoming request 202 satisfies any conditions specified in any one of the master rule(s) 114. If the first incoming request 202 satisfies any of the conditions specified in any one of the master rule(s) 114, the first firewall 112-1 may take one or more actions corresponding to the satisfied condition(s) in the master rule(s) 114. The first firewall 112-1 may further determine whether the first incoming request 202 satisfies any conditions specified in any one of the first application-specific rule(s) 116-1. If the first incoming request 202 satisfies any conditions specified in any one of the first application-specific rule(s) 116-1, the first firewall 112-1 may take one or more actions corresponding to the satisfied condition(s) in the application-specific rule(s) 116-1. In some implementations, the first firewall 112-1 may perform a default action on the first incoming request 202 if the first incoming request 202 does not satisfy the condition(s) in the master rule(s) 114 or the condition(s) in the first application-specific rule(s) 116-1. In some cases, the default action may include forwarding the first incoming request 202 to the first application 110-1.

In some examples, upon applying the master rule(s) 114 and/or the first application-specific rule(s) 116-1, the first firewall 112-1 may block the first incoming request 202. In response to determining to block the first incoming request 202, the first firewall 112-1 may return a message (not illustrated) indicating a delivery failure of the first incoming request 202 to the gateway 104 and/or a source of the first incoming request 202. The message may be a data packet addressed to the source of the first incoming request 202.

In particular implementations, upon applying the master rule(s) 114 and the first application-specific rule(s) 116-1, the first firewall 112-1 may forward an incoming request from the gateway 104 to the application 1 110-1. As illustrated in FIG. 2, the first firewall 112-1 can forward a second incoming request 204 to the first application 110-1. In particular implementations, the first application 110-1 may return content and/or perform a function in response to receiving the second incoming request 204. For example, if the second incoming request 204 is a request for data, the first application 110-1 may transmit at least one data packet containing the data to a source of the second incoming request 204 via the gateway 104 and a network, such as at least one of a cloud-based network, a Local Area Network (LAN), or a Wide Area Network (WAN). In some instances, if the second incoming request 204 is a request to perform a function (e.g., store data), the first application 110-1 may perform the function in response to receiving the second incoming request 204.

In some implementations, upon applying the master rule(s) 114 and/or the first application-specific rule(s) 116-1, the first firewall 112-1 may transmit at least one entry 208 to the firewall manager 118. The entry 208 may correspond to an incoming request received and/or forwarded by the first firewall 112-1 (e.g., the first incoming request 202 or the second incoming request 204) and at least one action taken by the first firewall 112-1 with respect to the incoming request. In some cases, the entry 208 may be packaged into a data packet that is transmitted from the first firewall 112-1 to the firewall manager 118 over a communication interface between the first firewall 112-1 and the firewall manager 118.

The firewall manager 118 may store the entry 208, or at least an indication of the entry 208, in the log 122. Based on the entry 208 and any other entries stored in the log 122, the firewall manager 118 can determine one or more new rules to add to the master rule(s) 114, which can then be distributed to first firewall 112-1 and any other firewall (e.g., the nth firewall 112-*n* described with reference to FIG. 1) in a firewall group that includes first firewall 112-1.

In particular implementations, the first development manager 124-1 may transmit one or more modifications 210 to the first firewall 112-1. The modification(s) 210 may be in the form of a data packet that is transmitted over a communication interface between the first development manager 124-1 and the first firewall 112-1. In particular implementations, the modification(s) 210 may be based on one or more inputs received by at least one developer device. The modification(s) 210 may specify at least one modification (e.g., a deletion, change, and/or addition) of the first firewall 112-1. In some implementations, the modification(s) 210 may specify at least one alteration (e.g., a deletion, change, or addition) of the master rule(s) 114 stored in the first firewall 112-1 and/or the first application-specific rule(s) 116-1 stored in the first firewall 112-1. The modification(s) 210 may cause the first firewall 112-1 to implement any alterations specified by the modification(s) 210 with respect to the master rule(s) 114 and/or the first application-specific rule(s) 116-1.

The first firewall 112-1 may transmit, to the firewall manager 118, an update indication 212 that can indicate any alteration implemented by the first firewall 112-1. The update indication 212, in particular implementations, can be a data packet transmitted over a communication interface between the first firewall 112-1 and the firewall manager 118. In some cases, the first firewall 112-1 generates and transmits the update indication 212 in response to implementing the modification(s) 210. In certain examples, the first firewall 112-1 periodically transmits the update indication 212. In particular examples, the first firewall 112-1 generates and transmits the update indication 212 in response to receiving a request (not illustrated) for the update indication 212 from the firewall manager 118.

In particular implementations, the modification(s) 210 may cause the first firewall 112-1 to alter the master rule(s) 114 stored in the first firewall 112-1, and the update indication 212 may indicate the alteration of the master rule(s) 114. In response to receiving the update indication 212 indicating the alteration of the master rule(s) 114, the firewall manager 118 may transmit the rule(s) indication 206, which may cause the first firewall 112-1 to restore the master rule(s) 114 to an unaltered state. Accordingly, the master rule(s) 114 may be implemented consistently in the first firewall 112-1 (and other firewalls in the same firewall group as first firewall 112-1), regardless of any attempted alterations of the master rule(s) 114 by developers.

In some implementations, the firewall manager 118 may generate and transmit the rule(s) indication 206 in response to a change in the master rule(s) 114 stored by the firewall manager 118. For example, when an administrator (e.g., via administrator device 120) adds a new rule to the master rule(s) 114, changes the existing master rule(s) 114, or deletes a rule in the master rule(s) 114, the firewall manager 118 may transmit an indication of the modification to the first firewall 112-1 in the rule(s) indication 206.

In some instances, when the firewall manager 118 adds a new rule to the master rule(s) 114 (e.g., the firewall manager 118 determines a new rule based at least in part on the log 122 and/or the entry 208), the firewall manager 118 may transmit an indication of the new rule to the first firewall 112-1 in the rule(s) indication 206. In various implementations, the rule(s) indication 206 may include a data packet transmitted over a communication interface between the firewall manager 118 and the first firewall 112-1.

Figure 3:
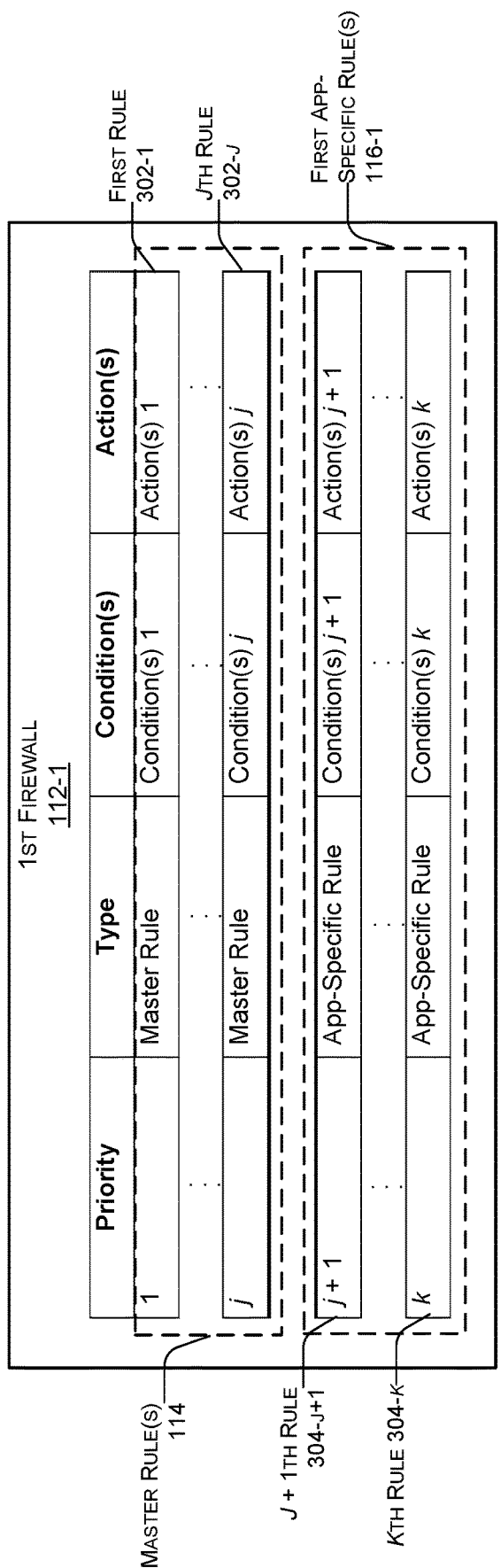
FIG. 3 shows various elements of a firewall according to various implementations, where the firewall includes at least one master rule and at least one application-specific rule.

FIG. 3 shows various elements of a firewall according to various implementations. For explanatory purposes, FIG. 3 depicts example elements of the first firewall 112-1 described above with reference to FIGS. 1 and 2.

As illustrated in FIG. 3, the first firewall 112-1 may implement various rules divided into the master rule(s) 114 and the first application-specific rule(s) 116-1. As illustrated in FIG. 3, the master rule(s) 114 may include first to jth rules 302-1 to 302-$j$, wherein j is a positive integer. In situations in which j is 1, the master rule(s) 114 may include only one rule. Further, the first application-specific rules 116-1 may include j+1th to kth rules 304-$j$+1 to 304-$k$, wherein k is a positive integer that is greater than j. When k is equal to j+1, the first application-specific rules 116-1 may include only one rule. In some implementations, the application-specific rules 116-1 may be omitted from the first firewall 112-1.

In various implementations, the master rule(s) 114 and the first application-specific rule(s) 116-1 may be stored in the form of a table. In some cases, the master rule(s) 114 and the first application-specific rule(s) 116-1 may be included in an Access Control List (ACL). In some examples, the first firewall 112-1 stores the ACL.

In particular implementations, each one of the first to kth rules 302-1 to 304-$k$ may specify a priority, a type, at least one condition, and at least one action. In various implementations, the master rule(s) 114 have at least one higher priority than the first application-specific rule(s) 116-1. For instance, the first to jth rules 302-1 to 302-$j$ may have priorities in a range of 1 to j, and the j+1th to kth rules 304-$j$+1 to 304-$k$ may have priorities in a range of j+1 to k. A first rule having a higher priority than a second rule may be implemented prior to the second rule. For instance, because the first rule 302-1 has a greater priority than the jth rule 302-$j$, the first rule 302-1 may be implemented by the first firewall 112-1 prior to the jth rule 302-$j$. Similarly, the master rule(s) 114 may be implemented by the first firewall 112-1 prior to the first application-specific rule(s) 116-1.

Each of the first to kth rules 302-1 to 304-$k$ in the first firewall 112-1 may have a type. FIG. 3 illustrates two types of rules: a type of the master rule(s) 114 and a type of the first application-specific rule(s) 116-1. However, in some cases, other types of rules can be included in the first firewall 112-1. In certain implementations, the master rule(s) 114 can be divided into multiple subtypes, and the first application-specific rule(s) 116-1 can be divided into multiple subtypes. In some cases, the type or subtype of a rule can correspond to a priority of the rule. For instance, the master rule(s) 114 may always have higher priorities (e.g., priorities 1 to j) than the first application-specific rule(s) 116-1 (e.g., priorities j+1 to k).

Each of the first to kth rules 302-1 to 304-$k$ in the first firewall 112-1 may specify at least one condition. The condition(s) of a given rule can be in the form of a conditional statement, a decision tree, or the like. In some examples, the condition(s) may specify at least one of a particular time interval at which an incoming request is received, at least one particular Internet Protocol (IP) address of the incoming request, a particular range of IP addresses of the incoming request, a type of the incoming request, at least one string in the incoming request, or the like. A time interval specified by a condition may be a single time interval (e.g., between 9:00-11:00 GMT on a particular day), a periodic time interval (e.g., 9:00-11:00 GMT every day), or a combination thereof (e.g., 9:00-11:00 GMT during the month of December). A type of the incoming request specified by a condition may be at least one type of HTTP request, such as at least one of an OPTIONS request, a GET request, a HEAD request, a POST request, a PUT request, a DELETE request, a TRACE request, a CONNECT request, or the like. The type of the incoming request, in some cases, may refer to a specified size range of the request (e.g., a request that is greater than a threshold number of bits). The string in the incoming request may refer to, in various instances, a string or portion of a string in a header of the request, a string or a portion of a string in a payload of the request, or the like.

As indicated in FIG. 3, the first to jth rules 302-1 to 302-$j$ of the master rule(s) 114 may respectively include Condition(s) 1 to j, and the j+1th to k rules 304-$j$+1 to 304-$k$ of the application-specific rule(s) 116-1 may respectively include Condition(s) j+1 to k.

Each of the first to kth rules 302-1 to 304-$k$ in the first firewall 112-1 may further specify at least one action that the first firewall 112-1 takes if the corresponding condition(s) are satisfied. The action(s) may include at least one of blocking the incoming request, forwarding the incoming request to a corresponding application, generating an entry corresponding to the incoming request, or the like. As indicated in FIG. 3, the first to jth rules 302-1 to 302-$j$ of the master rule(s) 114 may respectively include Action(s) 1 to j, and the j+1th to k rules 304-$j$+1 to 304-$k$ of the application-specific rule(s) 116-1 may respectively include Action(s) j+1 to k.

In particular implementations, the first to kth rules 302-1 to 304-$k$ in the first firewall 112-1 may protect against common security vulnerabilities, such as those identified by the Open Web Application Security Project (OWASP). For instance, one or more of the first to kth rules 302-1 to 304-$k$ may address injection vulnerabilities, broken authentication and session management vulnerabilities, Cross-Site Scripting (XSS) vulnerabilities, broken access control vulnerabilities, security misconfiguration vulnerabilities, sensitive data exposure vulnerabilities, insufficient attack protection vulnerabilities, Cross-Site Request Forgery (CSRF) vulnerabilities, under protected API vulnerabilities, or the like.

In particular examples, the master rule(s) 114 may be limited to the first rule 302-1 and the first application-specific rule(s) 116-1 may be limited to the kth rule 304-$k$. In some examples, the first rule 302-1 may specify that incoming requests should be blocked if they originate from an Internet Protocol (IP) address within a particular range. In other words, the first rule 302-1 may include a Condition 1 that specifies the particular range and an Action 1 that specifies that requests should be blocked. The kth rule 304-$k$ may specify that incoming request should be blocked if they are of a particular type (e.g., a "GET" request). In other words, the kth rule 304-$k$ may include a Condition k that specifies the particular type and an Action k that specifies that requests should be blocked. A default action for both the first rule and the second rule may be to forward the request.

When the first firewall 112-1 receives an incoming request from a network (e.g., a cloud-based network) and/or a gateway, the first firewall 112-1 may apply the first rule 302-1 before the kth rule 304-$k$, because the first rule 302-1 has a higher priority than the kth rule 304-$k$. In some instances, if the incoming request is determined to originate from an IP address within the particular range, the incoming request may be blocked by the first firewall 112-1 without the first firewall 112-1 determining whether the incoming request is of the particular type. However, if the incoming request is determined to originate from an IP address outside the particular range, the first firewall 112-1 may apply the kth rule 304-k to the incoming request. If, upon applying the kth rule 304-k to the incoming request, the first firewall 112-1 determines that the request is of the particular type, the first firewall 112-1 may block the incoming request. However, if, upon applying the kth rule 304-k to the incoming request, the first firewall 112-1 determines that the request is of a different type than the particular type, the first firewall 112-1 may forward the incoming request to another entity. For instance, the first firewall 112-1 may forward the incoming request to an application corresponding to the first firewall 112-1.

Figure 4:
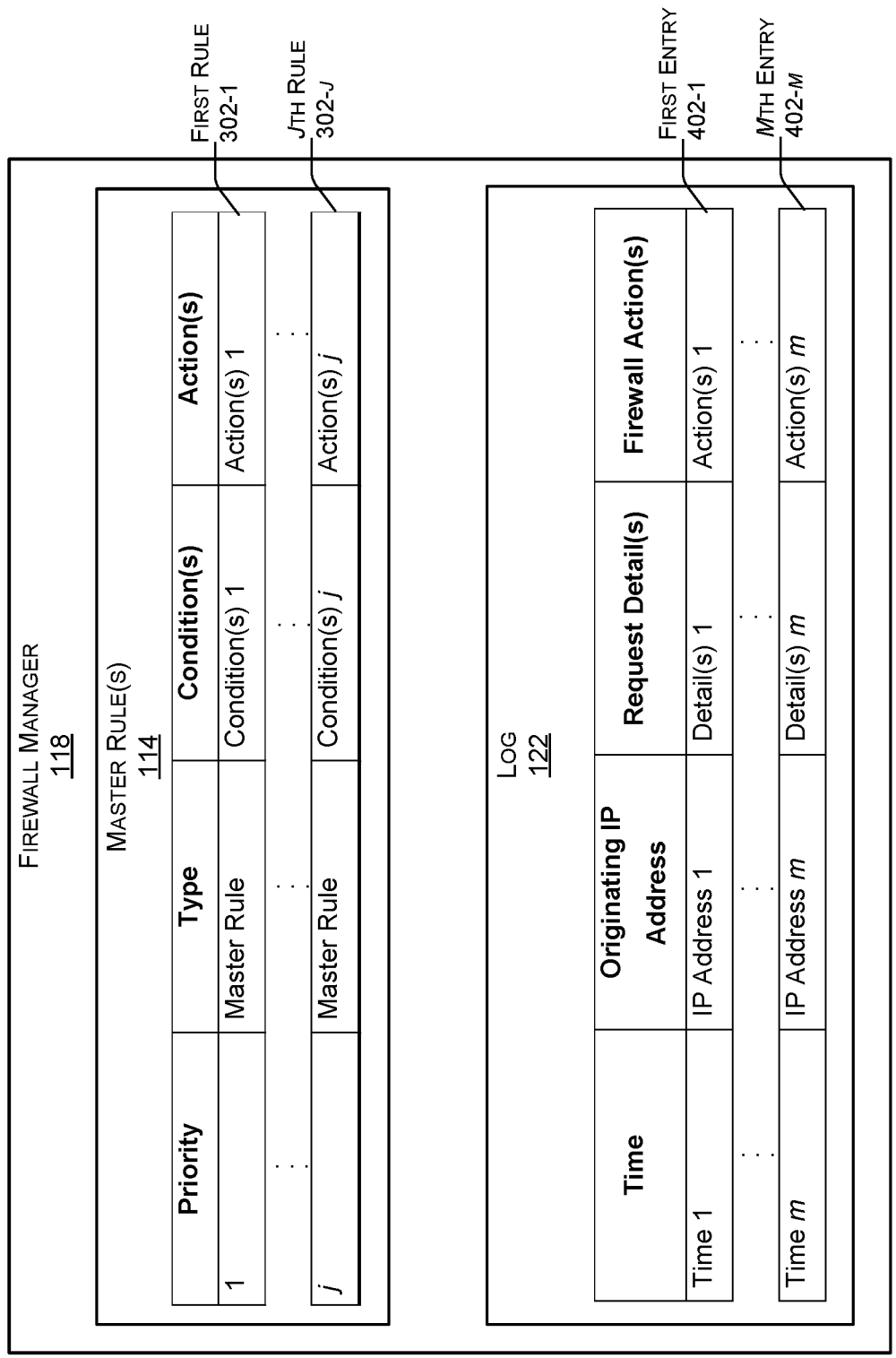
FIG. 4 illustrates an example of a firewall manager according to various implementations, where the firewall manager can store at least one master rule that can be distributed to various firewalls, and a log of entries indicating incoming requests received by the firewalls as well as operations performed by the various firewalls.

FIG. 4 illustrates an example of a firewall manager according to various implementations. In the particular example illustrated in FIG. 4, elements of the firewall manager 118 described above with reference to FIGS. 1 and 2 are provided.

As illustrated in FIG. 4, the firewall manager 118 stores a local copy of the master rule(s) 114. Accordingly, if the firewall manager 118 receives an update indication (e.g., update indication 212) that specifies a state of the master rule(s) 114 stored in a given firewall, the firewall manager 118 can determine if the master rule(s) 114 stored in the firewall should be restored. Further, the firewall manager 118 can distribute any of the master rule(s) 114 to a firewall (e.g., via the rule(s) indication 206).

The firewall manager 118 may also store a log 122. The log 122 may include multiple entries 402-1 to 402-m corresponding to various incoming requests received and/or acted upon by one or more firewalls in a firewall group, wherein m is a positive integer. In particular implementations, the entries may be reported to the firewall manager 118 by one or more firewalls (e.g., first firewall 112-1 and/or nth firewall 112-n) in a firewall group.

In various implementations, each one of the entries 402-1 to 402-m may indicate a time of an incoming request, an originating Internet Protocol (IP) address of the incoming request, at least one detail of the incoming request, and at least one action performed by a firewall with respect to the incoming request. In some cases, the time may include at least one of a timestamp at which the incoming request was received by the firewall, a time at which the incoming request was transmitted by the source originating the request, or the like. In various implementations, the originating IP address may include an IP address of at least one source of the incoming request. The details may include at least one of a type of the incoming request, a string in the incoming request, or the like. The firewall action(s) may include any of an indication that the incoming request was blocked, an indication that the incoming request was forwarded, or the like.

In particular examples, the firewall manager 118 may generate a new rule based on at least one of the entries 402-1 to 402-m in the log 122, add the new rule to the master rule(s) 114, and distribute the new rule to a firewall group. The firewall manager 118 may identify a trend in the entries 402-1 to 402-m and generate the new rule to address the trend. The trend may be associated with previously suspicious behavior. For instance, the firewall manager 118 may identify trends in entries 401-1 to 402-m indicating blocked incoming requests.

According to some implementations, the firewall manager 118 may determine a trend in suspicious behavior by identifying a common feature of more than a threshold number of the entries 402-1 to 402-m indicating blocked requests. For instance, the firewall manager 118 may identify that more than a threshold number of the entries 402-1 to 402-m correspond to blocked requests that are received during a particular time-of-day and/or date (e.g., between 00:01-03:00 on Thursdays), and may generate a new rule that blocks all incoming requests received during the particular time and/or date. In some examples, the firewall manager 118 may identify that more than a threshold number of the entries 402-1 to 402-m correspond to blocked requests that originate from a particular IP address or range of IP addresses, and may generate a new rule that blocks all incoming requests received from the particular IP address or range of IP addresses. In certain cases, the firewall manager 118 may identify that more than a threshold number of the entries 402-1 to 402-m share the same request detail(s) (e.g., recite the same string), and may generate a new rule that blocks all incoming requests sharing the same request detail(s).

In some examples, the firewall manager 118 may implement at least one machine learning algorithm to identify a trend in the entries 402-1 to 402-m. For instance, the firewall manager 118 may train a machine learning model using at least a portion of the entries 402-1 to 402-m corresponding to suspicious behavior (e.g., blocked requests). The machine learning model may identify complex patterns of suspicious behavior and use those identified patterns to generate a new rule.

Figure 5:
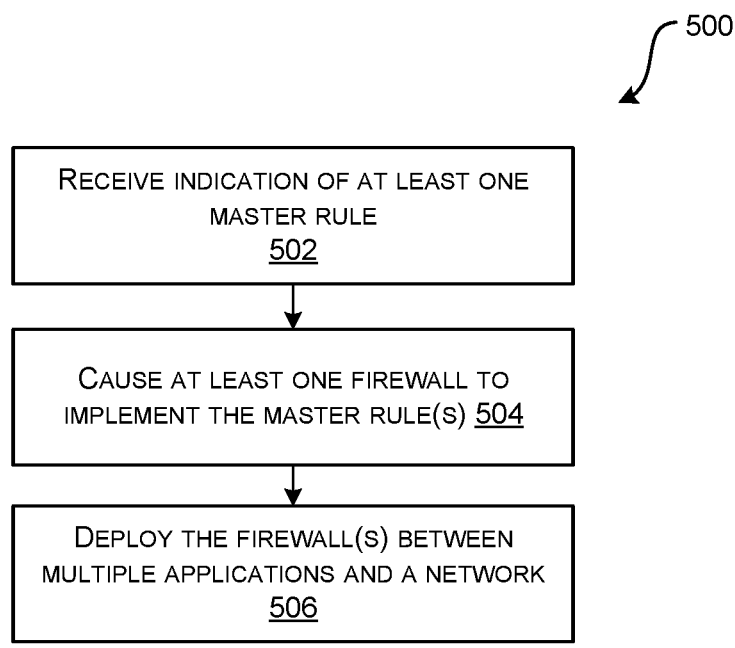
FIG. 5 illustrates an example process for implementing at least one master rule, where the at least one master rule is deployed between multiple applications and at least one network.

FIG. 5 illustrates an example process 500 for implementing at least one master rule. In various implementations, process 500 can be performed by at least one of a firewall system (e.g., firewall system 108) or a firewall manager 118 (e.g., firewall manager 118).

At 502, an indication of at least one master rule is received. In various implementations, the indication may specify at least one condition and at least one action of the master rule. In some cases, the indication may further specify a priority associated with the master rule. According to some implementations, the indication is received from at least one administrator device. In some cases, the indication is received from a firewall manager.

At 504, the master rule is implemented in at least one firewall corresponding to multiple applications. According to some implementations, the firewall(s) are generated in response to at least one of the applications being generated. In some cases, a single firewall is generated for a single application. In particular implementations, a single firewall is generated for multiple applications. In particular implementations, the master rule is added to an existing firewall. In some cases, the firewall(s) include at least one web Access Control List (ACL) in which the master rule is saved. In various implementations, the master rule is saved in the firewall.

In some implementations, an instruction to implement the master rule is transmitted to the firewall. For instance, an entity performing the process 500 may cause the firewall to implement the master rule by transmitting, to the firewall, an indication of the master rule.

At 506, the firewall(s) are deployed between the multiple applications and a network, such as at least one of a cloud-based network, a Local Area Network (LAN), or a Wide Area Network (WAN). In various implementations, the firewall(s) are deployed between a gateway and the multiple applications. In some cases, the firewall(s) are deployed within an Application Programming Interface (API) gateway, between the API gateway and the multiple applications, between a Content Delivery Network (CDN) and the multiple applications, between a load balancer and the multiple applications, within the CDN, within the load balancer, or the like.

When deployed, the firewall(s) may intercept one or more incoming requests and apply the master rule to the incoming request(s). In some cases, the firewall(s) can take at least one action based on whether the incoming request(s) satisfy the condition(s) of the master rule. In circumstances in which the firewall(s) also implement one or more application-specific rules, the firewall(s) may implement the master rule before implementing the application-specific rule(s).

Figure 6:
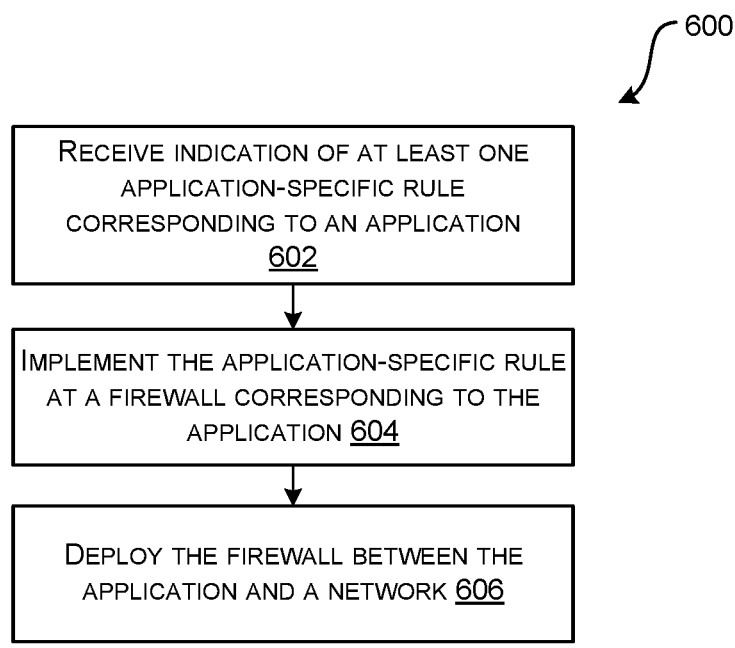
FIG. 6 illustrates an example process for implementing at least one application-specific rule, where the application-specific rule is deployed between a corresponding application and at least one network.

FIG. 6 illustrates an example process 600 for implementing at least one application-specific rule. In various implementations, process 600 can be performed by at least one of a firewall system (e.g., firewall system 108) or a development manager (e.g., any of the development managers 124-1 to 124-n).

At 602, an indication of at least one application-specific rule corresponding to an application is received. In various implementations, the indication may specify at least one condition and at least one action of the application-specific rule. In some cases, the indication may further specify a priority associated with the application-specific rule. According to some implementations, the indication is received from at least one developer device. In some cases, the indication is received from a development manager.

At 604, the application-specific rule is implemented in at least one firewall corresponding to the application. In some cases, a single firewall protects a single application. In particular implementations, a single firewall protects multiple applications. In some cases, the firewall(s) include at least one web Access Control List (ACL). In various implementations, the application-specific rule is saved in the firewall.

In some implementations, an instruction to implement the application-specific rule is transmitted to the firewall(s). That is, an entity performing the process 600 may cause the firewall(s) to implement the application-specific rule by transmitting, to the firewall(s), an indication of the application-specific rule.

At 608, the firewall(s) are deployed between the application and a network, such as at least one of a cloud-based network, a Local Area Network (LAN), or a Wide Area Network (WAN). In various implementations, the firewall(s) are deployed between a gateway and the multiple applications. In some cases, the firewall(s) are deployed between a Content Delivery Network (CDN) and the multiple applications, between a load balancer and the multiple applications, between an Application Programming Interface (API) gateway and the multiple applications, within the CDN, within the load balancer, within the API gateway, or the like.

When deployed, the firewall(s) may intercept one or more incoming requests and apply the master rule to the incoming request(s). In some cases, the firewall(s) can take at least one action based on whether the incoming request(s) satisfy the condition(s) of the application-specific rule. In circumstances in which the firewall(s) also implement one or more master rules, the firewall(s) may apply the application-specific rule after applying the master rule(s).

Figure 7:
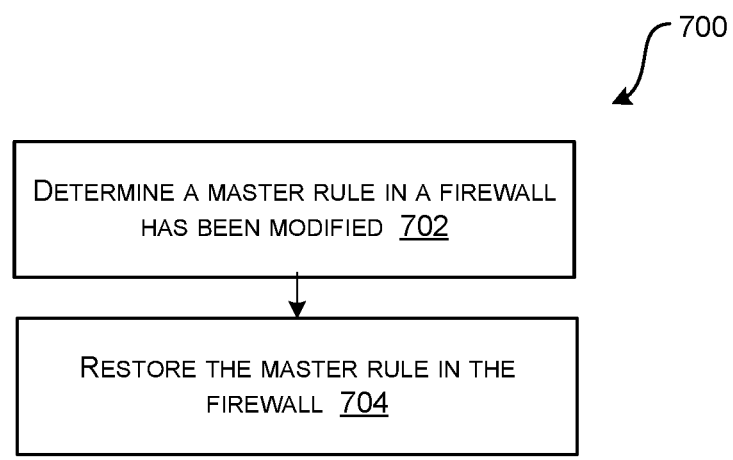
FIG. 7 illustrates an example process for automatically restoring a master rule that has been modified.

FIG. 7 illustrates an example process 800 for automatically replacing a master rule that has been deleted. In various implementations, process 700 can be performed by at least one of a firewall system (e.g., firewall system 108) or a firewall manager (e.g., firewall manager 118).

At 702, a master rule in a firewall is determined to have been modified. In some examples, the firewall may have been modified by a development manager, a developer device, or a combination thereof. In some cases, the master rule is determined to have been deleted, disabled, changed, or altered in any way.

In particular implementations, 702 includes receiving an indication that the master rule has been modified. The indication may be received, in some cases, from a separate firewall system that includes the firewall. In certain implementations, the master rule is stored locally. Accordingly, the master rule can be determined to be modified by querying a local memory for an indication of the master rule. In some cases, the master rule can be determined to have been modified by comparing the indication of the modified master rule to an unaltered copy of the master rule.

At 704, the master rule in the firewall is restored. In 704, an indication of the master rule may be transmitted to the firewall. In cases in which the master rule is determined to have been deleted from the firewall at 702, the master rule can be re-added to the firewall at 704. In circumstances in which the master rule is determined to have been partially altered at 702, an indication to alter the master rule in order to restore the master rule can be transmitted to the firewall at 704.

In various implementations, 704 can be performed automatically. For instance, 704 can be performed in response to determining that the master rule in the firewall has been modified, without receiving further instruction from a user and/or user device.

Figure 8:
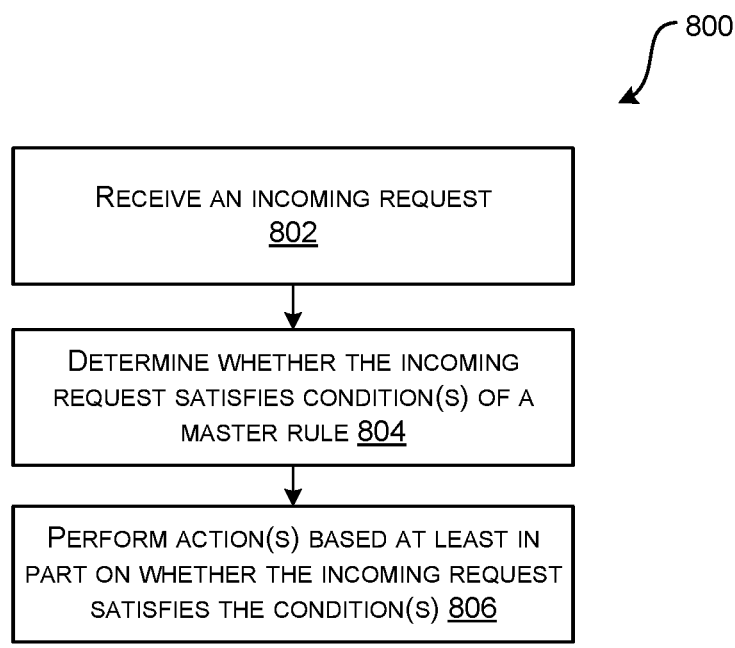
FIG. 8 illustrates an example process for deploying a firewall, including at least one operation with respect to an incoming request satisfying at least one condition.

FIG. 8 illustrates an example process 800 for deploying a firewall. In various implementations, process 800 can be performed by at least one of a firewall (e.g., first firewall 112-1), a firewall system (e.g., firewall system 108), or a firewall manager (e.g., firewall manager 118).

At 802, an incoming request is received. The incoming request may be received from at least one of a user device, a network (e.g., a cloud-based network), or a gateway, in particular implementations. In some cases, the incoming request includes a Hypertext Transfer Protocol (HTTP) request or an HTTP response. The incoming request may be received over a communication interface, such as a wireless interface, a wired interface, or the like.

At 804, the process 800 includes determining whether the incoming request satisfies at least one condition of a master rule. In various implementations, the master rule may be implemented by a firewall. The condition(s) may be specified as any of a conditional statement, a Boolean statement, or a decision tree.

At 806, at least one action may be performed based at least in part on whether the incoming request satisfies the condition(s). In some cases, in which the incoming request satisfies the condition(s), at least one action specified in the master rule may be performed. In various cases, the action(s) specified in the master rule may include at least one of forwarding the incoming request, blocking the incoming request, generating an entry corresponding to the incoming request, and causing the entry to be stored in a log. In certain examples in which the incoming request fails to satisfy the condition(s), at least one default action may be performed. In some examples, the default action(s) may include forwarding the incoming request to an application. The action(s) specified in the rule may be at least partially different than the default action(s). For instance, the action(s) specified in the master rule may include blocking the incoming request and the default action(s) may include forwarding the incoming request to the application.

Figure 9A:
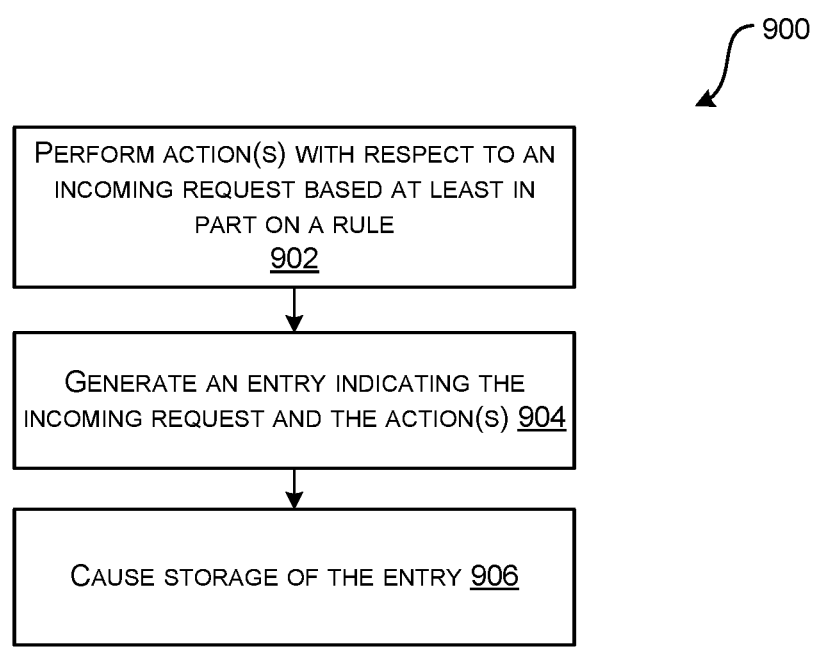
FIG. 9A illustrates an example process for generating entries based on actions performed by a firewall, where an entry indicates an incoming request, and at least one action performed with respect to the incoming request is generated and stored.

FIG. 9A illustrates an example process 900 for generating entries based on actions performed by a firewall. In various implementations, process 900 can be performed by at least one of a firewall system (e.g., firewall system 108) or a firewall manager (e.g., firewall manager 118).

At 902, at least one action is performed with respect to an incoming request based, at least in part, on a rule. The incoming request may be received from at least one of a user device, at least one network (e.g., a cloud-based network), or a gateway, in particular implementations. Based on the incoming request satisfying (or not satisfying) at least one condition in the rule, the rule may specify the action(s). The action(s) may include, in some cases, at least one of blocking the incoming request, forwarding the incoming request, or the like. In certain cases, the rule may specify that an entry corresponding to the incoming request should be generated.

At 904, an entry indicating the incoming request and the action(s) is generated. The entry can indicate the incoming request in a variety of ways. In particular implementations, the entry can indicate a time at which the incoming request is received. In some examples, the entry includes an originating Internet Protocol (IP) address of the incoming request. In particular implementations, the entry can include at least one detail about the incoming request, such as a type of the incoming request. In certain cases, the entry can further indicate the action(s) performed with respect to the incoming request.

At 906, storage of the entry is caused. In some implementations, the entry is stored in local memory, and is saved directly to the local memory. In particular implementations, an indication of the entry is transmitted to a separate system (e.g., a separate firewall manager) that can store the entry. In various implementations, the entry is stored in a log.

Figure 9B:
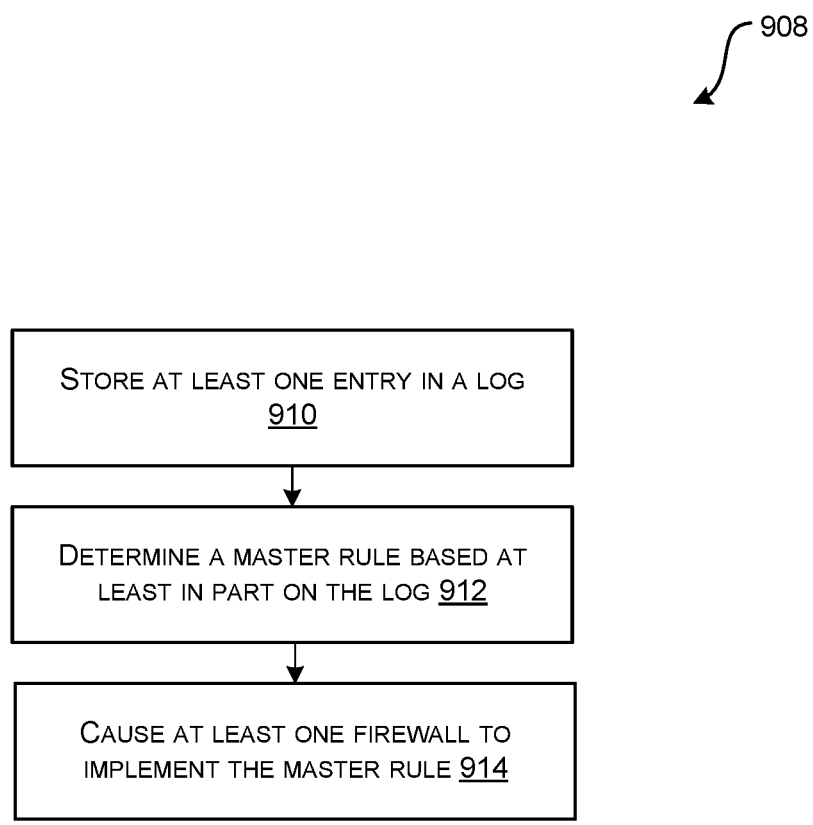
FIG. 9B illustrates an example process for deriving and implementing new master rules, where a new master rule is determined and implemented based on a log of entries corresponding to previously received incoming requests.

FIG. 9B illustrates an example process 908 for deriving and implementing new master rules. In various implementations, process 908 can be performed by at least one of a firewall system (e.g., firewall system 108) or firewall manager (e.g., firewall manager 118).

At 910, an entry is stored in a log. In some implementations, the entry is stored in local memory, and is saved directly to the local memory. In particular implementations, an indication of the entry is received from a separate system (e.g., a separate firewall system).

According to various implementations, the entry can indicate an incoming request that was received by a firewall. In particular implementations, the entry can indicate a time at which the incoming request is received. In some examples, the entry includes an originating Internet Protocol (IP) address of the incoming request. In particular implementations, the entry can include at least one detail about the incoming request, such as a type of the incoming request. In certain cases, the entry can further indicate the action(s) performed with respect to the incoming request.

At 912, a master rule is determined based at least in part on the log. According to various implementations, the log may include multiple entries corresponding to multiple incoming requests received by at least one firewall.

In particular implementations, the master rule is determined by analyzing the log. A trend associated with suspicious behavior can be determined based on the log. In particular examples, if the log indicates that a greater than a threshold number of incoming requests that have been previously blocked according to an existing master rule share another identifying feature that is not a condition of the existing master rule, the identifying feature may be a condition of a new master rule.

For instance, an existing master rule may specify that all "GET" requests received within the hours of 16:00-22:00 should be blocked. The log may indicate a number of incoming requests that were blocked based on the existing master rule, and a greater than threshold number of those blocked incoming requests are associated with the same IP address. The fact that the number of those blocked incoming requests are associated with the same IP address indicates that the IP address is suspicious. Accordingly, a new rule may be generated, wherein the new rule indicates that all requests received from the suspicious IP address should be blocked.

In various implementations, a master rule can be determined by applying the log to at least one machine learning algorithm. For example, previously identified suspicious behavior can be used to train a machine learning model, such as a feature learning model, a sparse dictionary learning model, an anomaly detection model, a decision tree model, an association rule model, or the like. The model, once trained, can be applied to the log to identify new trends in suspicious behavior. A new master rule targeting the suspicious behavior (e.g., blocking incoming requests associated with the suspicious behavior) can be automatically generated using the trained machine learning model.

At 916, the process 908 includes causing at least one firewall to implement the master rule. In particular implementations, the master rule can be stored at the firewall(s). In some circumstances, an indication of the master rule can be transmitted to the firewall(s), which may cause the firewall(s) to store the master rule. Once the firewall(s) implement the master rule, the firewall(s) may be able to apply the master rule to incoming requests received by the firewall(s).

Figure 10:
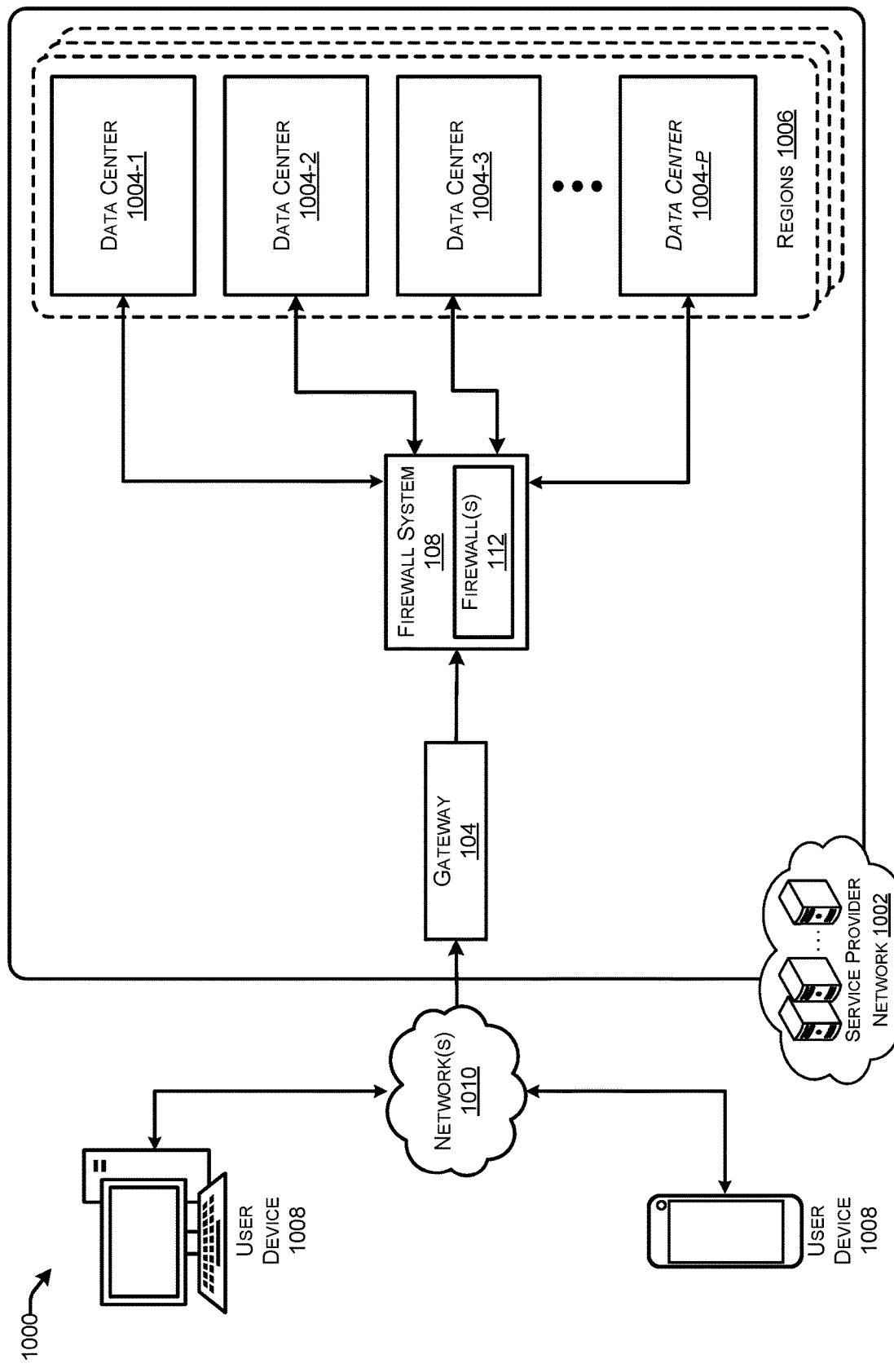
FIG. 10 is a system and network diagram that shows an illustrative operating environment including a service provider network that can be configured to implement aspects of the functionality described herein.

FIG. 10 is a system and network diagram that shows an illustrative operating environment that includes a service provider network that can be configured to implement aspects of the functionality described herein. The service provider network 1002 can provide computing resources, like Virtual Machine (VM) instances and storage, on a permanent or an as-needed basis.

Among other types of functionality, the computing resources provided by the service provider network 1002 may be utilized to implement various services described above. As also discussed above, the computing resources provided by the service provider network 1002 can include various types of computing resources, such as data processing resources like VM instances, data storage resources, networking resources, data communication resources, network services, and the like.

Each type of computing resource provided by the service provider network 1102 can be general-purpose or can be available in a number of specific configurations. For example, data processing resources can be available as physical computers or VM instances in a number of different configurations. The VM instances can be configured to execute applications, including web servers, application servers, media servers, database servers, gaming applications, and/or other types of programs. Data storage resources can include file storage devices, block storage devices, and the like. The service provider network 1002 can also be configured to provide other types of computing resources not mentioned specifically herein.

The computing resources provided by the service provider network 1002 may be enabled in some implementations by one or more data centers 1004-1 to 1004-*p*, wherein p is a positive integer. The data center(s) 1004-1 to 1004-*p* might be referred to herein singularly as "a data center 1004" or in the plural as "the data centers 1004"). The data centers 1004 are facilities utilized to house and operate computer systems and associated components. The data centers 1004 can include redundant and backup power, communications, cooling, and security systems. The data centers 1004 can also be located in geographically disparate locations, or regions 1006. One illustrative embodiment for a data center 1004 that can be utilized to implement the technologies disclosed herein will be described below with regard to FIG. 11.

Various user devices 1008 that utilize the service provider network 1002 may access the computing resources provided by the service provider network 1002 over any wired and/or wireless network(s) 1010, which can be a Wide Area Network (WAN), such as the Internet, an intranet or an Internet Service Provider (ISP) network or a combination of such networks. In some cases, network(s) 1010 may include a cloud-based network. In some examples, without limitation, a user device 1008 operated by a client of the service provider network 1002 may be utilized to access the service provider network 1002 by way of the network(s) 1010. It should be appreciated that a Local Area Network (LAN), the Internet, or any other networking topology known in the art that connects the data centers 1004 to remote clients and other users can be utilized. It should also be appreciated that combinations of such networks can also be utilized.

In particular implementations, the user device 1008 may transmit an incoming request to the service provider network 1002. In some examples, the incoming request may be destined for an application hosted by at least one of the data centers 1004. The incoming request may be transmitted to a gateway 104 in the service provider network 1004 by the network(s) 1010. The gateway 104 may transmit the incoming request to a firewall system 108 implementing one or more firewalls 112. The firewall(s) 112 may intercept the incoming request and evaluate the incoming request in view of various rules stored in the firewall(s) 112, such as master rules and/or application-specific rules. In some cases, upon applying the rules, the firewall system 108 may forward the incoming request to an appropriate one of the data centers 1004 that corresponds to the application that is the destination of the incoming request.

In some cases, although not specifically illustrated in FIG. 10, at least a portion of the gateway 104 and/or the firewall system 108 can be hosted by one or more of the data centers 1004. For instance, the gateway 104 may be hosted by one of the data centers 1004 in relatively close geographical proximity to the user device 1008, and at least one application can be hosted by one of the data centers 1004 that is located farther from the user device 1008 than the gateway 104.

Figure 11:
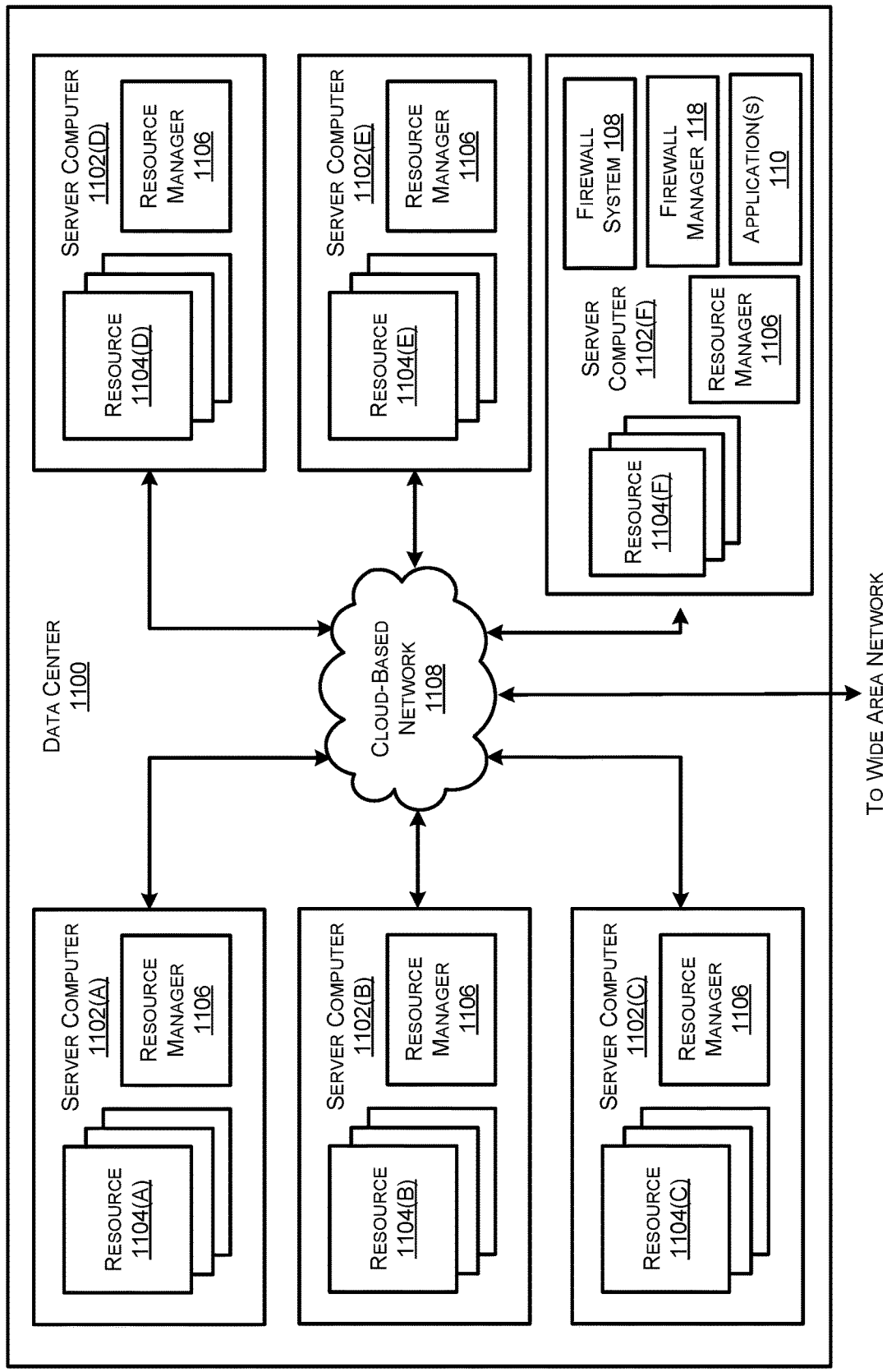
FIG. 11 is a computing system diagram illustrating a configuration for a data center that can be utilized to implement aspects of the technologies disclosed herein.

FIG. 11 is a computing system diagram illustrating a configuration for a data center 1100 that can be utilized to implement aspects of the technologies disclosed herein. The example data center 1100 shown in FIG. 11 includes several server computers 1102A-1102F (which might be referred to herein singularly as "a server computer 1102" or in the plural as "the server computers 1102") for providing computing resources 1104A-1104E. In some examples, the resources 1104 and/or server computers 1102 may include, be included in, or correspond to, the computing resource network 1102 described above with reference to FIG. 11.

The server computers 1102 can be standard tower, rackmount, or blade server computers configured appropriately for providing the computing resources described herein (illustrated in FIG. 11 as the computing resources 1104A-1104E). As mentioned above, the computing resources provided by the service provider network 1102 can be data processing resources such as Virtual Machine (VM) instances or hardware computing systems, database clusters, computing clusters, storage clusters, data storage resources, database resources, networking resources, and others. Some of the servers 1102 can also be configured to execute a resource manager 1106 capable of instantiating and/or managing the computing resources. In the case of VM instances, for example, the resource manager 1106 can be a hypervisor or another type of program configured to enable the execution of multiple VM instances on a single server computer 1102. Server computers 1102 in the data center 1100 can also be configured to provide network services and other types of services.

In the example data center 1100 shown in FIG. 11, an appropriate cloud-based network 1108 is also utilized to interconnect the server computers 1102A-1102F. It should be appreciated that the configuration and network topology described herein has been greatly simplified and that many more computing systems, software components, networks, and networking devices can be utilized to interconnect the various computing systems disclosed herein and to provide the functionality described above. Appropriate load balancing devices or other types of network infrastructure components can also be utilized for balancing a load between each of the data centers 1004-1 to 1004-$p$ (described above with reference to FIG. 10), between each of the server computers 1102A-1102F in the data center 1100, and, potentially, between computing resources in each of the server computers 1102. It should be appreciated that the configuration of the data center 1100 described with reference to FIG. 11 is merely illustrative and that other implementations can be utilized.

The data center 1100 shown in FIG. 11 also includes a server computer 1102F that can execute some or all of the software components described above. For example, and without limitation, the server computer 1102F can implement the firewall system 108, application(s) 110, and/or the firewall manager 118 described above. In some examples, the application(s) 110 are distinct VM instances on server computer 1102F from the and the firewall manager 118 are distinct VM instances on server computer 1102F. The server computer 1102F can also be configured to execute other components and/or to store data for providing some or all of the functionality described herein. In this regard, it should be appreciated that the services illustrated in FIG. 11 as executing on the server computer 1102F can execute on many other physical or virtual servers in the data centers 1004 in various embodiments.

Figure 12:
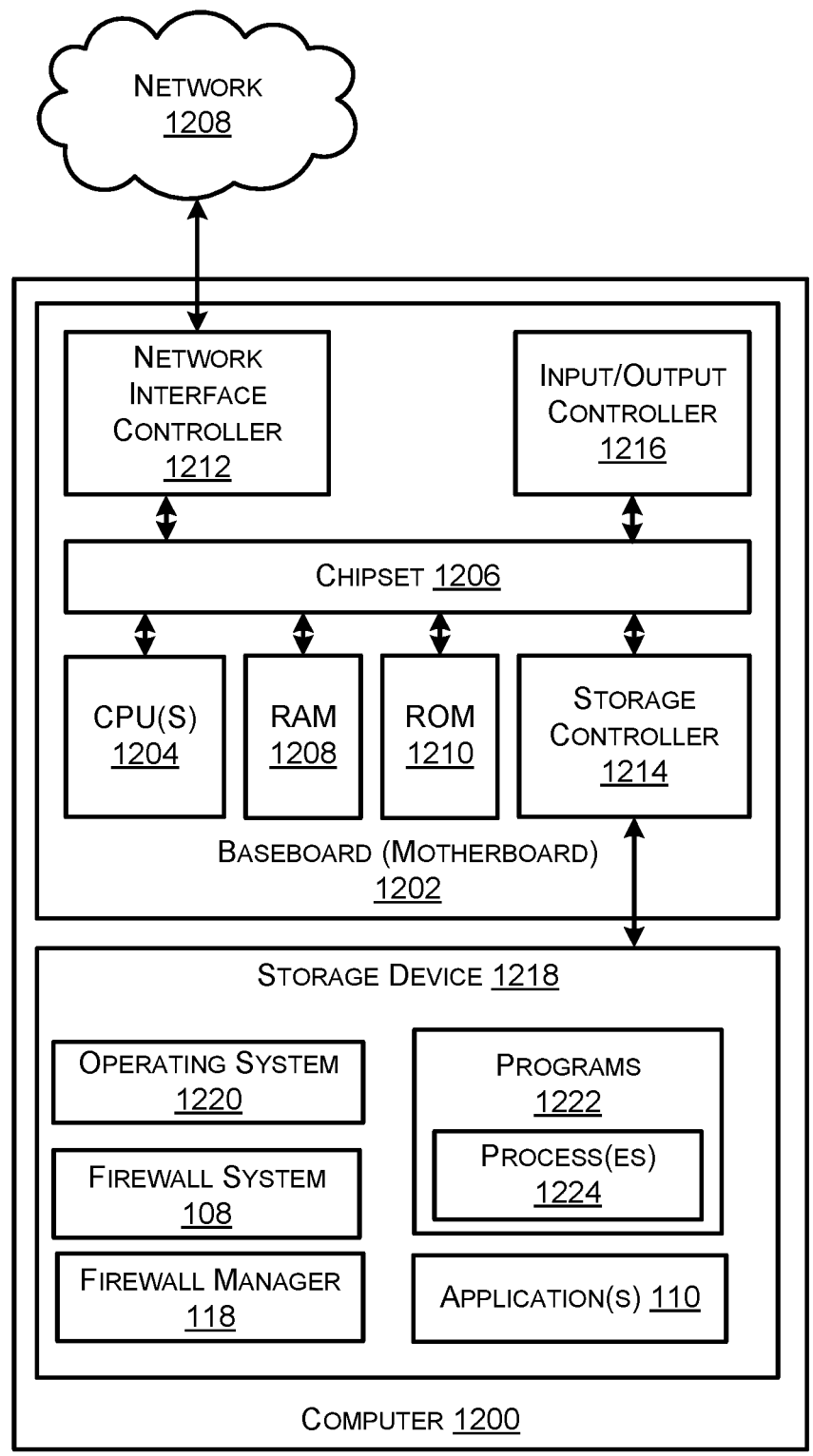
FIG. 12 is a computer architecture diagram showing an illustrative computer hardware architecture for implementing a computing device that can be utilized to implement aspects of the various technologies presented herein.

FIG. 12 is a computer architecture diagram showing an illustrative computer hardware architecture for implementing a computing device that can be utilized to implement aspects of the various technologies presented herein. The computer architecture shown in FIG. 12 illustrates a conventional server computer, workstation, desktop computer, laptop, tablet, network appliance, e-reader, smartphone, or other computing device, and can be utilized to execute any of the software components presented herein.

The computer 1200 includes a baseboard 1202, or "motherboard," which is a printed circuit board to which a multitude of components or devices can be connected by way of a system bus or other electrical communication paths. In one illustrative configuration, one or more Central Processing Units (CPUs) 1204 operate in conjunction with a chipset 1206. The CPUs 1204 can be standard programmable processors that perform arithmetic and logical operations necessary for the operation of the computer 1200.

The CPUs 1204 perform operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

The chipset 1206 provides an interface between the CPUs 1204 and the remainder of the components and devices on the baseboard 1202. The chipset 1206 can provide an interface to a RAM 1208, used as the main memory in the computer 1200. The chipset 1206 can further provide an interface to a computer-readable storage medium such as a Read-Only Memory (ROM) 1210 or Non-Volatile RAM ("NVRAM") for storing basic routines that help to startup the computer 1200 and to transfer information between the various components and devices. The ROM 1210 or NVRAM can also store other software components necessary for the operation of the computer 1200 in accordance with the configurations described herein.

The computer 1200 can operate in a networked environment using logical connections to remote computing devices and computer systems through a network 1228. In various implementations, the network 1228 can include at least one of a cloud-based network, a Local Area Network (LAN), or a Wide Area Network (WAN). The chipset 1206 can include functionality for providing network connectivity through a Network Interface Controller (NIC) 1212, such as a gigabit Ethernet adapter. The NIC 1212 is capable of connecting the computer 1200 to other computing devices over the network 1228. It should be appreciated that multiple NICs 1212 can be present in the computer 1200, connecting the computer 1200 to other types of networks and remote computer systems.

The computer 1200 can be connected to a mass storage device 1218 that provides non-volatile storage for the computer. The mass storage device 1218 can store an operating system 1220, programs 1222 (e.g., processes 1224), as well as the firewall system 108, application(s) 110, firewall manager 118, and data, which have been described in greater detail herein. The mass storage device 1218 can be connected to the computer 1200 through a storage controller 1214 connected to the chipset 1206. The mass storage device 1218 can consist of one or more physical storage units. The storage controller 1214 can interface with the physical storage units through a Serial attached SCSI (SAS) interface, a Serial Advanced Technology Attachment (SATA) interface, a Fiber Channel (FC) interface, or other type of interface for physically connecting and transferring data between computers and physical storage units.

The computer 1200 can store data on the mass storage device 1218 by transforming the physical state of the physical storage units to reflect the information being stored. The specific transformation of physical state can depend on various factors, in different embodiments of this description. Examples of such factors can include, but are not limited to, the technology used to implement the physical storage units, whether the mass storage device 1218 is characterized as primary or secondary storage, and the like.

For example, the computer 1200 can store information to the mass storage device 1218 by issuing instructions through the storage controller 1214 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computer 1200 can further read information from the mass storage device 1218 by detecting the physical states or characteristics of one or more particular locations within the physical storage units.

In addition to the mass storage device 1218 described above, the computer 1200 can have access to other computer-readable storage media to store and retrieve information, such as program modules, data structures, or other data. It should be appreciated by those skilled in the art that computer-readable storage media is any available media that provides for the non-transitory storage of data and that can be accessed by the computer 1200. In some examples, the operations performed by the service provider network 1002 described above with reference to FIG. 10, and or any components included therein, may be supported by one or more devices similar to computer 1200. Stated otherwise, some or all of the operations performed by the service provider network 1002, and or any components included therein, may be performed by one or more computer devices 1200 operating in a network-based arrangement.

By way of example, and not limitation, computer-readable storage media can include volatile and non-volatile, removable and non-removable media implemented in any method or technology. Computer-readable storage media includes, but is not limited to, RAM, ROM, Erasable Programmable ROM (EPROM), Electrically-Erasable Programmable ROM (EEPROM), flash memory or other solid-state memory technology, Compact Disc ROM (CD-ROM), Digital Versatile Disk (DVD), High Definition DVD (HD-DVD), BLU-RAY, or other optical storage, magnetic cassettes, magnetic tape, magnetic disk storage or other magnetic storage devices, or any other medium that can be used to store the desired information in a non-transitory fashion.

As mentioned briefly above, the mass storage device 1218 can store an operating system 1220 utilized to control the operation of the computer 1200. According to one embodiment, the operating system comprises the LINUX operating system. According to another embodiment, the operating system comprises the WINDOWS® SERVER operating system from MICROSOFT Corporation of Redmond, Wash. According to further embodiments, the operating system can comprise the UNIX operating system or one of its variants. It should be appreciated that other operating systems can also be utilized. The mass storage device 1218 can store other system or application programs and data utilized by the computer 1200.

In one embodiment, the mass storage device 1218 or other computer-readable storage media is encoded with computer-executable instructions which, when loaded into the computer 1200, transform the computer from a general-purpose computing system into a special-purpose computer capable of implementing the embodiments described herein. These computer-executable instructions transform the computer 1200 by specifying how the CPUs 1204 transition between states, as described above. According to one embodiment, the computer 1200 has access to computer-readable storage media storing computer-executable instructions which, when executed by the computer 1200, perform the various processes described above with regard to FIGS. 1 to 9B. The computer 1200 can also include computer-readable storage media having instructions stored thereupon for performing any of the other computer-implemented operations described herein.

The computer 1200 can also include one or more input/output controllers 1216 for receiving and processing input from a number of input devices, such as a keyboard, a mouse, a touchpad, a touch screen, an electronic stylus, or other type of input device. Similarly, an input/output controller 1216 can provide output to a display, such as a computer monitor, a flat-panel display, a digital projector, a printer, or other type of output device. It will be appreciated that the computer 1200 might not include all of the components shown in FIG. 12, can include other components that are not explicitly shown in FIG. 12, or might utilize an architecture completely different than that shown in FIG. 12.

The environments and individual elements described herein may of course include many other logical, programmatic, and physical components, of which those shown in the accompanying figures are merely examples that are related to the discussion herein.

Other architectures may be used to implement the described functionality, and are intended to be within the scope of this disclosure. Furthermore, although specific distributions of responsibilities are defined above for purposes of discussion, the various functions and responsibilities might be distributed and divided in different ways, depending on circumstances.

Furthermore, although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A system comprising:
   one or more processors; and
   at least one memory storing computer-executable instructions that, when executed, cause the one or more processors to perform acts comprising:
      identifying a rule associated with blocking a first type of incoming traffic that satisfies a first condition;
      storing the rule in a first Access Control List (ACL) of a first firewall corresponding to a first application;
      storing the rule in a second ACL of a second firewall corresponding to a second application;
      identifying an application-specific rule corresponding to the first application, the application-specific rule being associated with blocking a second type of incoming traffic that satisfies a second condition;
      storing the application-specific rule in the first ACL with the rule;
      deploying the first firewall in a Content Delivery Network (CDN) between a cloud-based network and the first application; and
      deploying the second firewall in the CDN between the cloud-based network and the second application.

2. The system of claim 1, wherein deploying the multiple firewalls comprises:
   receiving, at the first firewall and from a remote computing device, an incoming request that is directed to the first application;
   determining, by applying the rule at the first firewall, that the incoming request fails to satisfy the first condition;
   in response to determining that the first incoming request fails to satisfy the first condition, determining, by applying the application-specific rule at the first firewall, that the incoming request fails to satisfy the second condition; and
   in response to determining that the incoming request fails to satisfy the second condition, forwarding, by the first firewall, the incoming request to the first application.

3. The system of claim 1, wherein the acts further comprise:
   determining that the rule has been deleted from the second ACL; and
   in response to determining that the rule has been deleted from the second ACL, automatically storing the rule in the second ACL.

4. The system of claim 1, wherein the acts further comprise:
   receiving, at the second firewall and from a remote computing device, an incoming request that is directed to the second application;
   determining, by applying the rule at the second firewall, that the second incoming request satisfies the first condition;
   in response to determining that the incoming request satisfies the first condition, blocking, by the second firewall, the incoming request from being received by the second application;
   in response to blocking the incoming request, generating an entry indicating (i) a time at which the incoming request was received by the second firewall, (ii) an originating Internet Protocol (IP) address of the remote computing device, (iii) a type of the incoming request, and (iv) that the incoming request has been blocked from reaching the second application;
   storing the entry in a log;
   determining, based on the log, a new rule;
   storing the new rule in the first ACL; and
   storing the new rule in the second ACL.

5. A system comprising:
   one or more processors; and
   memory storing computer-executable instructions that, when executed, cause the one or more processors to perform acts comprising:
      identifying at least one rule associated with performing at least one first operation on a first type of data traffic that satisfies at least one first condition;
      causing multiple firewalls to implement the at least one rule, a first firewall among the multiple firewalls implementing at least one application-specific rule in addition to the at least one rule, the at least one application-specific rule being associated with performing at least one second operation on a second type of data traffic that satisfies at least one second condition; and
      deploying the multiple firewalls between multiple applications and at least one network, the first firewall being deployed between a first application among the multiple applications and the at least one network.

6. The system of claim 5, wherein the at least one rule is associated with blocking the first type of data traffic that satisfies the at least one first condition, and
   wherein the at least one application-specific rule is associated with blocking the second type of data traffic that is directed to the first application and that satisfies the at least one second condition.

7. The system of claim 5, wherein the acts further comprise:
   determining that the at least one rule has been modified in a second firewall among the multiple firewalls; and
   in response to determining that the at least one rule has been modified, restoring the at least one rule in the second firewall.

8. The system of claim 5, wherein at least one of the multiple firewalls comprises at least one web Access Control List (ACL), and
  wherein causing the multiple firewalls to implement the at least one rule comprises storing the at least one rule in the at least one ACL.

9. The system of claim 5, wherein the multiple firewalls are deployed between at least one node device and at least one host device of a Content Delivery Network (CDN), the at least one host device implementing the multiple applications.

10. The system of claim 5, wherein deploying the multiple firewalls comprises:
  receiving, by the first firewall, an incoming request directed to the first application from a load balancer, the load balancer connecting the at least one network to the first firewall.

11. The system of claim 5, wherein the at least one rule is at least one first rule, and
  wherein the acts further comprise:
    generating an entry indicating (i) an incoming request transmitted to a second firewall among the multiple firewalls, and (ii) whether the at least one first operation was performed by the second firewall with respect to the incoming request upon applying the at least one rule to the incoming request;
    determining a second rule based at least partly on the entry, the second rule being associated with performing at least one third operation on a third type of data traffic that satisfies at least one third condition; and
    causing the multiple firewalls to implement the second rule.

12. The system of claim 5, wherein the acts further comprise:
  receiving, by a second firewall among the multiple firewalls, an incoming request directed to a second application among the multiple applications;
  determining, by the second firewall, that the incoming request satisfies the at least one first condition, the at least one first condition specifying at least one of an Internet Protocol (IP) address of a source of the incoming request, an IP address range including the IP address of the source of the incoming request, a type of the incoming request, or a string in the incoming request; and
  in response to determining that the incoming request satisfies the at least one first condition, performing, by the second firewall, the at least one first operation with respect to the incoming request, the at least one first operation comprising at least one of blocking the incoming request from being received by the second application, forwarding the incoming request to the second application, or generating an entry indicating the incoming request.

13. A method comprising:
  identifying, by one or more processors of a computing device, at least one rule associated with performing at least one first operation on a first type of data traffic that satisfies at least one first condition;
  causing, by the one or more processors, multiple firewalls to implement the at least one rule, a first firewall among the multiple firewalls implementing at least one application-specific rule in addition to the at least one rule, the at least one application-specific rule being associated with performing at least one second operation on a second type of data traffic that satisfies at least one second condition; and
  deploying, by the one or more processors, the multiple firewalls between multiple applications and at least one network, the first firewall being deployed between a first application among the multiple applications and the at least one network.

14. The method of claim 13, wherein the at least one rule is associated with blocking the first type of data traffic that satisfies the at least one first condition, and
  wherein the at least one application-specific rule is associated with blocking the second type of data traffic that is directed to the first application and that satisfies the at least one second condition.

15. The method of claim 13, further comprising:
  determining that the at least one rule has been modified in a second firewall among the multiple firewalls; and
  in response to determining that the at least one rule has been modified, restoring the at least one rule in the second firewall.

16. The method of claim 13, wherein at least one of the multiple firewalls comprises at least one web Access Control List (ACL), and
  wherein causing the multiple firewalls to implement the at least one rule comprises storing the at least one rule in the at least one ACL.

17. The method of claim 13, wherein the multiple firewalls are deployed between at least one node device and at least one host device of a Content Delivery Network (CDN), the at least one host device implementing the multiple applications.

18. The method of claim 13, wherein deploying the multiple firewalls comprises:
  receiving, by the first firewall, an incoming request directed to the first application from a load balancer, the load balancer connecting the at least one network to the first firewall.

19. The method of claim 13, wherein the at least one rule is at least one first rule, and
  wherein the method further comprises:
    generating an entry indicating (i) an incoming request transmitted to a second firewall among the multiple firewalls, and (ii) whether the at least one first operation was performed by the second firewall with respect to the incoming request upon applying the at least one rule to the incoming request;
    determining a second rule based at least partly on the entry, the second rule being associated with performing at least one third operation on a third type of data traffic that satisfies at least one third condition; and
    causing the multiple firewalls to implement the second rule.

20. The method of claim 13, further comprising:
  receiving, by a second firewall among the multiple firewalls, an incoming request directed to a second application among the multiple applications;
  determining, by the second firewall, that the incoming request satisfies the at least one first condition, the at least one first condition specifying at least one of an Internet Protocol (IP) address of a source of the incoming request, an IP address range including the IP address of the source of the incoming request, a type of the incoming request, or a string in the incoming request; and
  in response to determining that the incoming request satisfies the at least one first condition, performing, by the second firewall, the at least one first operation with respect to the incoming request, the at least one first operation comprising at least one of blocking the incoming request from being received by the second application, forwarding the incoming request to the second application, or generating an entry indicating the incoming request.

\* \* \* \* \*